(12) United States Patent
Kim et al.

(10) Patent No.: US 9,599,845 B2
(45) Date of Patent: Mar. 21, 2017

(54) LIQUID CRYSTAL DISPLAY AND MANUFACTURING METHOD THEREOF

(71) Applicant: SAMSUNG DISPLAY CO., LTD., Yongin, Gyeonggi-Do (KR)

(72) Inventors: Sung Man Kim, Seoul (KR); Duk-Sung Kim, Asan-si (KR); Man Hong Na, Seoul (KR); Jun Ho Song, Seongnam-si (KR); Young Je Cho, Asan-si (KR)

(73) Assignee: SAMSUNG DISPLAY CO., LTD., Yongin, Gyeonggi-Do (KR)

( * ) Notice: Subject to any disclaimer, the term of this patent is extended or adjusted under 35 U.S.C. 154(b) by 151 days.

(21) Appl. No.: 14/180,759

(22) Filed: Feb. 14, 2014

(65) Prior Publication Data

US 2014/0247411 A1    Sep. 4, 2014

(30) Foreign Application Priority Data

Mar. 4, 2013 (KR) ........................ 10-2013-0022959

(51) Int. Cl.
*G02F 1/135* (2006.01)
*G02F 1/133* (2006.01)
(Continued)

(52) U.S. Cl.
CPC ...... *G02F 1/13306* (2013.01); *G02F 1/13439* (2013.01); *G02F 1/134363* (2013.01);
(Continued)

(58) Field of Classification Search
CPC ........................ G02F 1/134363; G02F 1/13306
(Continued)

(56) References Cited

U.S. PATENT DOCUMENTS 5,892,494 A * 4/1999 Kimura ................ G09G 3/3648
345/90
6,111,626 A    8/2000 Watanabe et al.
(Continued)

FOREIGN PATENT DOCUMENTS

KR    10-2004-0025472    3/2004
KR    10-2009-0054194    5/2009
(Continued)

OTHER PUBLICATIONS

European Search Report Dated Jun. 4, 2014.
European Search Report Dated Nov. 12, 2014.

*Primary Examiner* — Lucy Chien
(74) *Attorney, Agent, or Firm* — F. Chau & Associates, LLC.

(57) ABSTRACT

A liquid crystal display includes a plurality of pixel electrodes and common electrodes disposed on a first substrate that overlap each other with a passivation layer interposed therebetween, and a connection portion disposed between a common voltage applying unit and the common electrode. The common electrode has a plurality of first cutouts, the passivation layer has a plurality of second cutouts, and the first cutout and the second cutout have substantially the same planar shape. The connection portion includes a lower connection portion formed from a same layer as the common electrode, and an upper connection portion disposed on the lower connection portion that includes a low resistance metal.

11 Claims, 45 Drawing Sheets

(51) Int. Cl.
*G02F 1/1343* (2006.01)
*G02F 1/1345* (2006.01)
*G02F 1/139* (2006.01)
*G02F 1/1362* (2006.01)

(52) U.S. Cl.
CPC .......... *G02F 1/1345* (2013.01); *G02F 1/1396* (2013.01); *G02F 2001/134372* (2013.01); *G02F 2001/136231* (2013.01)

(58) Field of Classification Search
USPC .......................................................... 349/46
See application file for complete search history.

(56) References Cited

U.S. PATENT DOCUMENTS

| | | | | |
|---|---|---|---|---|
| 6,506,617 | B1* | 1/2003 | Cheng | G02F 1/134363 438/155 |
| 7,545,463 | B2 | 6/2009 | Park | |
| 2002/0044246 | A1* | 4/2002 | Moon | G02F 1/1345 349/141 |
| 2002/0101557 | A1 | 8/2002 | Ono et al. | |
| 2009/0073364 | A1* | 3/2009 | Matsuno | G02F 1/134363 349/138 |
| 2009/0108259 | A1 | 4/2009 | Lin et al. | |
| 2009/0323005 | A1 | 12/2009 | Ota | |
| 2010/0001973 | A1* | 1/2010 | Hotelling | G02F 1/13338 345/174 |
| 2011/0157534 | A1* | 6/2011 | Hong | G02F 1/134363 349/141 |
| 2011/0273412 | A1 | 11/2011 | Lee et al. | |
| 2012/0105778 | A1* | 5/2012 | Fujiyoshi | G02F 1/134363 349/106 |
| 2012/0105781 | A1 | 5/2012 | Lee et al. | |
| 2012/0190143 | A1 | 7/2012 | Lee et al. | |
| 2012/0300152 | A1* | 11/2012 | Anjo | G02F 1/134363 349/43 |
| 2014/0085557 | A1* | 3/2014 | Kim | G02F 1/134309 349/43 |

FOREIGN PATENT DOCUMENTS

| | | |
|---|---|---|
| KR | 10-2011-0066737 | 6/2011 |
| KR | 10-2012-0072817 | 7/2012 |
| KR | 10-1172048 | 8/2012 |

* cited by examiner

LIQUID CRYSTAL DISPLAY AND MANUFACTURING METHOD THEREOF

CROSS-REFERENCE TO RELATED APPLICATION

This application claims priority under 35 U.S.C. 119 from Korean Patent Application No. 10-2013-0022959 filed in the Korean Intellectual Property Office on Mar. 4, 2013, and all the benefits accruing therefrom, the contents of which are herein incorporated by reference in their entireties.

BACKGROUND (a) Technical Field

The present disclosure is directed to a liquid crystal display and a manufacturing method thereof.

(b) Discussion of the Related Art

A liquid crystal display, which is one of the most common types of flat panel displays currently in use, is a display device which rearranges liquid crystal molecules of a liquid crystal layer by applying voltages to electrodes to control an amount of transmitted light.

A liquid crystal display may be easily formed as a thin film, but has poor side visibility compared with front visibility. Various types of liquid crystal alignments and driving methods have been developed to improve side visibility. One method for implementing a wide viewing angle involves forming a pixel electrode and a common electrode on one substrate.

For a liquid crystal display, at least one of the two field generating electrodes, i.e., the pixel electrode and the common electrode, has a plurality of cutouts and has a plurality of branch electrodes defined by the plurality of cutouts.

As such, in the case of forming two field generating electrodes on one display panel, to form each field generating electrode, different photomasks are required, which increases the manufacturing cost.

Further, in the case where the common electrodes to which a predetermined magnitude of voltage is applied are connected to each other, signals applied to the common electrodes may be delayed.

SUMMARY

Exemplary embodiments provide a liquid crystal display and a manufacturing method thereof with lower manufacturing costs and that can prevent signal delays in the common electrode when two field generating electrodes are formed on one display panel.

An exemplary embodiment of the present disclosure provides a liquid crystal display that includes a plurality of pixel electrodes and common electrodes disposed on a first substrate that overlap each other with a passivation layer interposed therebetween, and a connection portion disposed between a common voltage applying unit and the common electrode. The common electrode has a plurality of first cutouts, the passivation layer has a plurality of second cutouts, and the first cutout and the second cutout have substantially the same planar shape. The connection portion includes a lower connection portion formed from a same layer as the common electrode, and an upper connection portion disposed on the lower connection portion that includes a low resistance metal.

The common voltage applying unit is disposed in a peripheral area around a display area that includes the plurality of pixel electrodes. The liquid crystal display may further include a common voltage line disposed on a portion of the common electrode.

The common voltage line may be formed from the same layer as the upper connection portion.

The common voltage line may extend parallel to the gate line.

The common voltage line may be disposed between two adjacent data lines and extend parallel to the data lines.

The first substrate may include an insulation substrate; a plurality of gate lines and a plurality of data lines disposed on the insulation substrate; a plurality of thin film transistors connected to the plurality of gate lines and the plurality of data lines, respectively; and an organic layer disposed on the plurality of thin film transistors and upon which the plurality of pixel electrodes and common electrodes are disposed.

The organic layer may be a color filter.

The liquid crystal display may further include a light blocking member disposed on the first substrate.

The liquid crystal display may further include a second substrate facing the first substrate; and a compensation electrode disposed on an outer surface of the second substrate.

The common electrode on the first substrate may overlap the data line to form a first capacitor, and the compensation electrode on the second substrate may form a second capacitor with the common electrode.

The compensation electrode may be configured to receive a voltage having a polarity opposite to that of a data voltage applied to the data line to compensate for a coupling between the data line and the common electrode.

Another exemplary embodiment of the present disclosure provides a method of manufacturing a liquid crystal display that includes forming a plurality of gate lines and a plurality of data lines on a first substrate; forming an organic layer on the plurality of gate lines and the plurality of data lines; forming a plurality of pixel electrodes on the organic layer; depositing a first layer that includes an insulating material on the plurality of pixel electrodes; depositing a second layer that includes a transparent conductor on the first layer; forming a photosensitive film pattern on the second layer; and etching the second layer and the first layer using the first photosensitive film pattern as an etching mask to simultaneously form a common electrode that includes a plurality of first cutouts and a passivation layer that includes a plurality of second cutouts.

The manufacturing method of a liquid crystal display may further include forming a common voltage applying unit disposed in a peripheral area around a display area that includes the plurality of pixel electrodes; and forming a connection portion disposed between the common voltage applying unit and the common electrode.

The connection portion may be formed with the common electrode and the passivation layer.

The organic layer may include a color filter.

The method of manufacturing a liquid crystal display may further include forming a light blocking member on the first substrate.

The method of manufacturing a liquid crystal display may further include forming a compensation electrode on an outer surface of the second substrate facing the first substrate.

Yet another exemplary embodiment of the present disclosure provides a method of manufacturing a liquid crystal display includes forming a plurality of gate lines and a plurality of data lines on a first substrate; forming an organic layer on the plurality of gate lines and the plurality of data lines; forming a plurality of pixel electrodes on the organic layer; depositing a first layer that includes an insulating material on the plurality of pixel electrodes; depositing a second layer that includes a transparent conductor on the first layer; depositing a third layer that includes a low resistance metal on the second layer; forming photosensitive film patterns on the third layer that have thicknesses that vary by position; forming a first insulating layer from the first layer and a common electrode from the second layer by etching the third layer, the second layer, and the first layer using the second photosensitive film pattern as an etching mask; forming another photosensitive film pattern by removing a part of the second photosensitive film pattern; and forming a common voltage line on a portion of the common electrode by etching the third layer using the another photosensitive film pattern as an etching mask.

The method of manufacturing a liquid crystal display may further include crystallizing the second layer by annealing the first substrate either before or after forming the third photosensitive film pattern.

The method of manufacturing a liquid crystal display may further include forming a common voltage applying unit in a peripheral area around a display area that includes the plurality of pixel electrodes; and forming a connection portion between the common voltage applying unit and the common electrode, wherein the connection portion may be formed simultaneously with the common electrode and the first insulating layer.

Forming the connection portion may include forming a lower connection portion from the same layer as the common electrode when forming the common electrode, and forming an upper connection portion from the same layer as the common voltage line when forming the common voltage line.

According to the exemplary embodiments of the present disclosure, it is possible to prevent an increase in manufacturing cost and prevent a signal delay of a common electrode while two field generating electrodes are formed on one display panel.

DETAILED DESCRIPTION OF EXEMPLARY EMBODIMENTS

Figure 1:
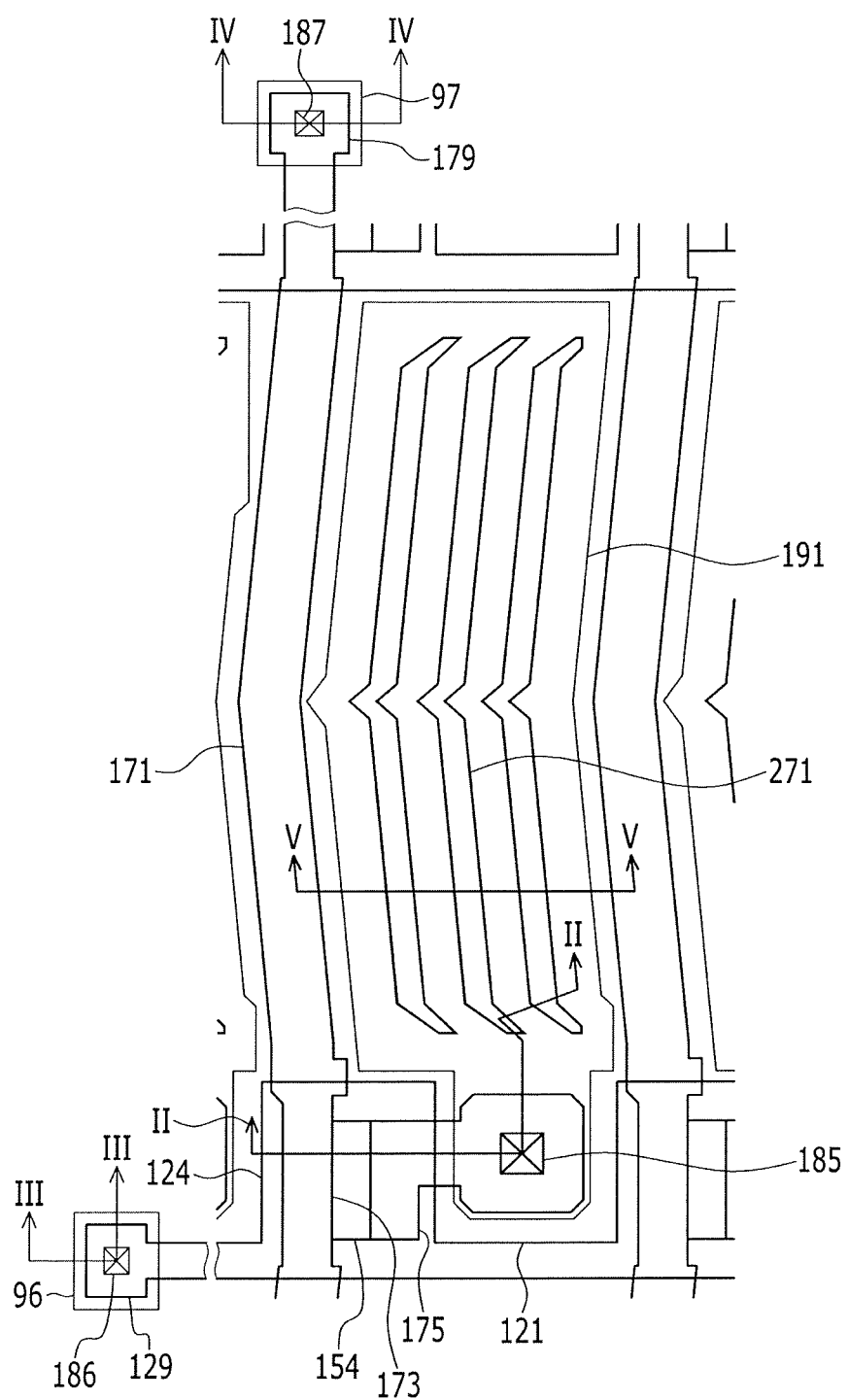
FIG. 1 is a layout view illustrating a liquid crystal display according to an exemplary embodiment of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present.

A liquid crystal display according to exemplary embodiments of the present disclosure will be described with reference to the drawings.

Figure 2:
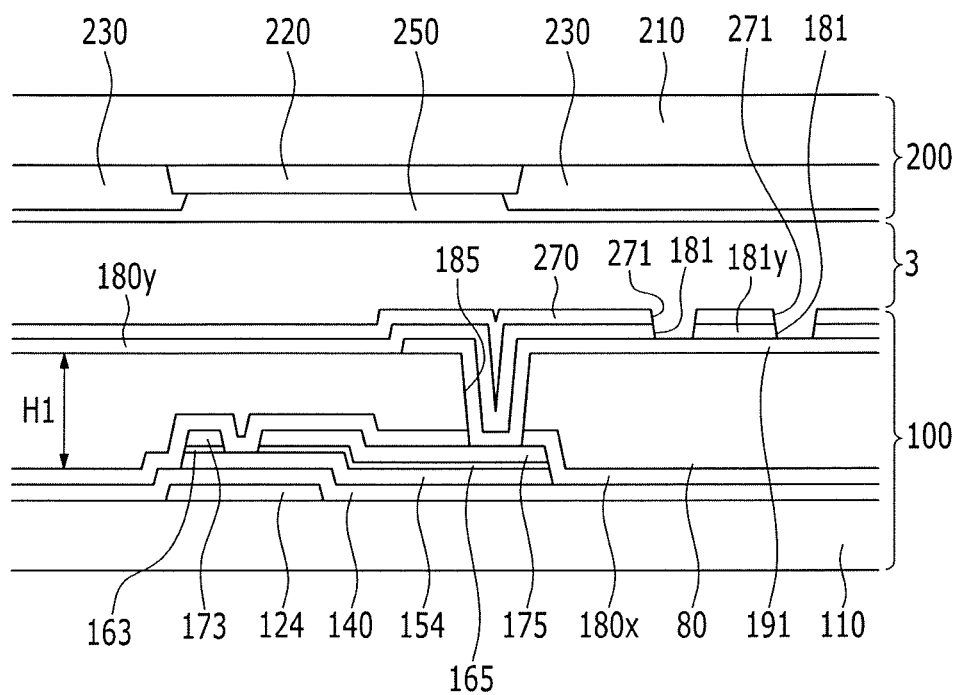
FIG. 2 is a cross-sectional view of the liquid crystal display of FIG. 1 taken along line II-II.
Figure 3:
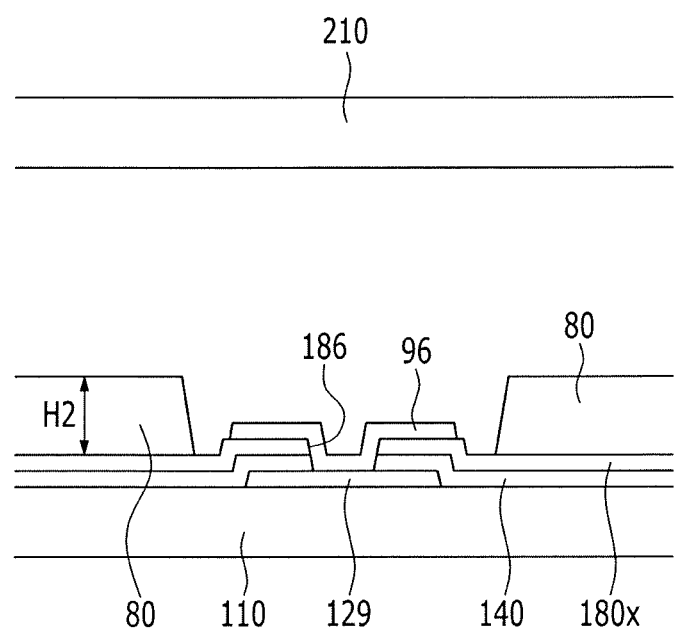
FIG. 3 is a cross-sectional view of the liquid crystal display of FIG. 1 taken along line III-III.
Figure 4:
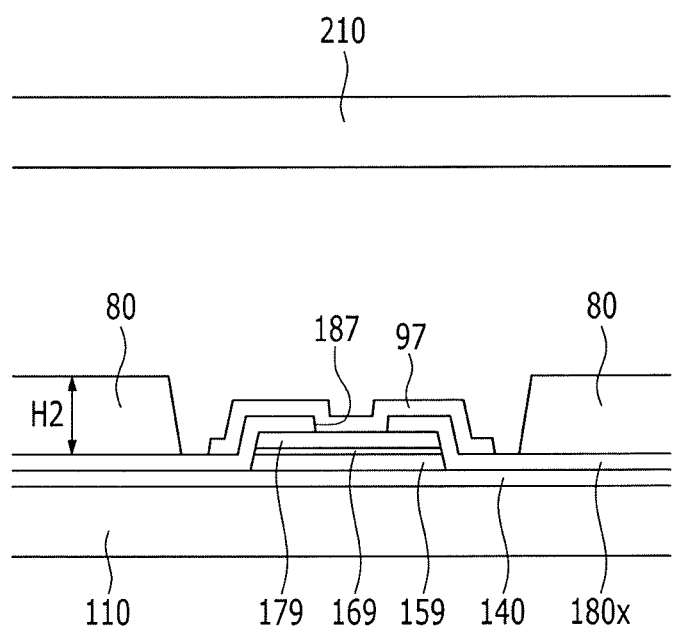
FIG. 4 is a cross-sectional view of the liquid crystal display of FIG. 1 taken along line IV-IV.

First, a liquid crystal display according to an exemplary embodiment of the present disclosure will be described with reference to FIGS. 1 to 24. FIG. 1 is a layout view illustrating a liquid crystal display according to an exemplary embodiment of the present disclosure. FIG. 2 is a cross-sectional view of the liquid crystal display of FIG. 1 taken along line II-II, FIG. 3 is a cross-sectional view of the liquid crystal display of FIG. 1 taken along line III-III and FIG. 4 is a cross-sectional view of the liquid crystal display of FIG. 1 taken along line IV-IV.

Referring to FIGS. 1 to 4, a liquid crystal display device according to an exemplary embodiment of the present disclosure includes a lower panel 100 and an upper panel 200 facing each other, and a liquid crystal layer 3 interposed between the two panels 100 and 200.

First, the lower panel 100 will be described.

A gate conductor including a gate line 121 is formed on a first insulation substrate 110 including transparent glass or plastic.

The gate line 121 includes a gate electrode 124 and a wide gate pad portion 129 for connection with another layer or an external driving circuit. The gate line 121 may include an aluminum based metal such as aluminum (Al) or an aluminum alloy, a silver based metal such as silver (Ag) or a silver alloy, a copper based metal such as copper (Cu) or a copper alloy, a molybdenum based metal such as molybdenum (Mo) or a molybdenum alloy, chromium (Cr), tantalum (Ta), and titanium (Ti). However, the gate line 121 may have a multilayered structure including at least two conductive layers having different physical properties.

A gate insulating layer 140 including silicon nitride (SiNx) or silicon oxide (SiOx) is formed on the gate conductors 121, 124, and 129. The gate insulating layer 140 may have a multilayered structure including at least two insulating layers having different physical properties.

A semiconductor 154 including amorphous silicon or polysilicon is formed on the gate insulating layer 140. The semiconductor 154 may include an oxide semiconductor.

Ohmic contacts 163 and 165 are formed on the semiconductor 154. The ohmic contacts 163 and 165 may include a silicide or a material such as n+ hydrogenated amorphous silicon in which an n-type impurity such as phosphorus is doped at high concentration. The ohmic contacts 163 and 165 may be disposed on the semiconductor 154 to make a pair. If semiconductor 154 is an oxide semiconductor, the ohmic contacts 163 and 165 may be omitted.

A data conductor including a data line 171, a source electrode 173 and a drain electrode 175 is disposed on the ohmic contacts 163 and 165 and the gate insulating layer 140.

The data line 171 includes a data pad portion 179 for connection with another layer or an external driving circuit.

The data line 171 transfers a data signal and mainly extends in a vertical direction to cross the gate line 121.

In this case, the data line 171 may have a first curved portion having a curved shape to maximize transmittance of the liquid crystal display, and the curved portion may have a V-letter shape when viewed from above, whose vertex is in a middle region of a pixel area. A second curved portion that forms a predetermined angle with the first curved portion may be further included in the middle region of the pixel area.

The first curved portion of the data line 171 may form an angle of about 7° with respect to a vertical reference line that is perpendicular to an extending direction of the gate line 121. The second curved portion disposed in the middle region of the pixel area may further form an angle of about 7° to about 15° with respect to the first curved portion.

The source electrode 173 is part of the data line 171 and is disposed on the same line as the data line 171. The drain electrode 175 extends parallel to the source electrode 173. Accordingly, the drain electrode 175 is parallel with a part of the data line 171.

The drain electrode 175 includes a first, rod-shaped end portion and a second, wide end portion which faces the source electrode 173 disposed on the gate electrode 124.

A first semiconductor 159 and a first contact assistant 169 are disposed below the data pad portion 179. The first semiconductor 159 and the first contact assistant 169 may be omitted.

The gate electrode 124, the source electrode 173, and the drain electrode 175 form a thin film transistor (TFT) together with the semiconductor 154, and a channel is formed in the semiconductor 154 between the source electrode 173 and the drain electrode 175.

A liquid crystal display according to an exemplary embodiment of the present disclosure includes the source electrode 173 disposed on the data line 171 while the drain electrode 175 extends parallel to the data line 171, which may increase a width of the thin film transistor while not increasing an area of the data conductor to increase an aperture ratio of the liquid crystal display.

However, in the case of a liquid crystal display according to another exemplary embodiment of the present disclosure, the source electrode 173 and the drain electrode 175 may have different shapes.

The data line 171 and the drain electrode 175 may include a refractory metal such as molybdenum, chromium, tantalum, and titanium or an alloy thereof, and may have a multilayered structure including a refractory metal layer (not illustrated) and a low resistance conductive layer (not illustrated). Examples of a multilayered structure include a double layer including a chromium or molybdenum (alloy) lower layer and an aluminum (alloy) upper layer, and a triple layer including a molybdenum (alloy) lower layer, an aluminum (alloy) intermediate layer, and a molybdenum (alloy) upper layer. However, the data line 171 and the drain electrode 175 may include various other metals or conductors in addition to those listed.

A first passivation layer 180x is disposed on the data conductors 171, 173, 175, and 179, the gate insulating layer 140, and an exposed portion of the semiconductor 154. The first passivation layer 180x may include an organic insulating material or an inorganic insulating material.

An organic layer 80 is disposed on the first passivation layer 180x. The organic layer 80 has a thickness greater than that of the first passivation layer 180x and may have a flat upper surface.

A first thickness H1 of the organic layer 80 disposed in a display area where a plurality of pixels are disposed may be greater than a second thickness H2 of the organic layer 80 disposed in a peripheral area where the gate pad portion 129 and the data pad portion 179 are formed.

Alternatively, the organic layer 80 may be disposed in the display area where the plurality of pixels is disposed, but may not be disposed in the peripheral area where the gate pad portion and the data pad portion are formed.

In a liquid crystal display according to another exemplary embodiment of the present disclosure, the organic layer 80 may be omitted.

The organic layer 80 is removed from a region corresponding to the drain electrode 175, the gate pad portion 129, and the data pad portion 179.

A first contact hole 186 exposing the gate pad portion 129 is formed in the first passivation layer 180x and the gate insulating layer 140 in the region corresponding to the gate pad portion 129 from which the organic layer 80 was removed.

A second contact hole 187 exposing the data pad portion 179 is formed in the first passivation layer 180x disposed in the region corresponding to the data pad portion 179 from which the organic layer 80 was removed.

A third contact hole 185 is formed in the first passivation layer 180x disposed in the region corresponding to the drain electrode 175 from which the organic layer 80 was removed.

A pixel electrode 191 is formed on the organic layer 80. The pixel electrode 191 includes curved edges which are substantially parallel with the first curved portion and the second curved portion of the data line 171.

The pixel electrode 191 may include a transparent conductive layer such as ITO or IZO.

The pixel electrode 191 is physically and electrically connected with the drain electrode 175 through the third contact hole 185 to receive a voltage from the drain electrode 175.

A first contact assistant 96 is formed on the gate pad portion 129 exposed through the first contact hole 186, and a second contact assistant 97 is formed on the data pad portion 179 exposed through the second contact hole 187.

The pixel electrode 191, the first contact assistant 96, and the second contact assistant 97 may be simultaneously formed on the same layer.

A second passivation layer 180y is formed on the pixel electrode 191, and a common electrode 270 is formed on the second passivation layer 180y. The common electrode 270 may include a transparent conductive layer such as ITO or IZO.

The second passivation layer 180y and the common electrodes 270 have substantially the same planar shape.

The second passivation layer 180y and the common electrode 270 are disposed in the display area where the plurality of pixels is disposed, but are not disposed in the peripheral area where the gate pad portion 129 and the data pad portion 179 are formed.

The common electrode 270 has a plurality of first cutouts 271, and the second passivation layer 180y has a plurality of second cutouts 181. The first cutouts 271 of the common electrode 270 and the second cutouts 181 of the passivation layer 180y have the same planar shape. More specifically, edges of the first cutouts 271 overlap edges of the second cutouts 181.

Although not illustrated, an alignment layer is coated on portions of the pixel electrode 191 and the common electrode 270 exposed by the second cutouts 181, and the alignment layer may be a vertical alignment layer that is rubbed in a predetermined direction. However, according to a liquid crystal display according to another exemplary embodiment of the present disclosure, the alignment layer may include a photoreactive material to be photo-aligned.

Then, the upper panel 200 will be described.

A light blocking member 220 is formed on a second insulation substrate 210 made of transparent glass or plastic. The light blocking member 220 is also called a black matrix and blocks light leakage.

Further, a plurality of color filters 230 is formed on the second substrate 210.

An overcoat 250 is formed on the color filter 230 and the light blocking member 220. The overcoat 250 may include an organic insulator, provides a flat surface, and can prevent the color filter 230 from being exposed. The overcoat 250 may be omitted.

The alignment layer may be disposed on the overcoat 250.

The liquid crystal layer 3 includes a liquid crystal material having positive dielectric anisotropy. The liquid crystal molecules of the liquid crystal layer 3 are aligned so that directions of long axes thereof are parallel to surfaces of the panels 100 and 200, and the direction has a 90° twisted spiral structure from a rubbing direction of the alignment layer up to the upper panel 200.

The pixel electrode 191 receives a data voltage from the drain electrode 175, and the common electrode 270 receives a common voltage having a predetermined magnitude from a common voltage applying unit disposed outside of the display area.

The pixel electrode 191 and the common electrode 270, which are the field generating electrodes, generate an electric field and the liquid crystal molecules disposed on the two electrodes 191 and 270 rotate in a direction parallel to the direction of the electric field. As such, polarization of light passing through the liquid crystal layer varies according to the rotation direction of the liquid crystal molecules.

In a liquid crystal display according to an exemplary embodiment of the present disclosure, the second passivation layer 180y disposed on the pixel electrode 191 and the common electrodes 270 disposed on the second passivation layer 180y have substantially the same planar shape. In more detail, the common electrode 270 has a plurality of first cutouts 271, the second passivation layer 180y has a plurality of second cutouts 181, and the first cutouts 271 and the second cutouts 181 have substantially the same planar shape. More specifically, edges of the first cutouts 271 overlap edges of the second cutouts 181.

Therefore, the second passivation layer 180y and the common electrode 270 may be formed together by using one photomask.

Accordingly, an increase in manufacturing cost of the liquid crystal display may be prevented.

For a liquid crystal display according to an exemplary embodiment illustrated in FIGS. 1 to 4, the organic layer 80 is disposed on the first passivation layer 180x of the lower panel 100, and the color filter 230 and the light blocking member 220 are disposed on the upper panel 200. However, for a liquid crystal display according to another exemplary embodiment of the present disclosure, the color filter 230, instead of the organic layer 80, may be disposed on the lower panel 100, not on the upper panel 200. In this case, the light blocking member 220 may also be disposed on the lower panel 100, not the upper panel 200.

Figure 5A:
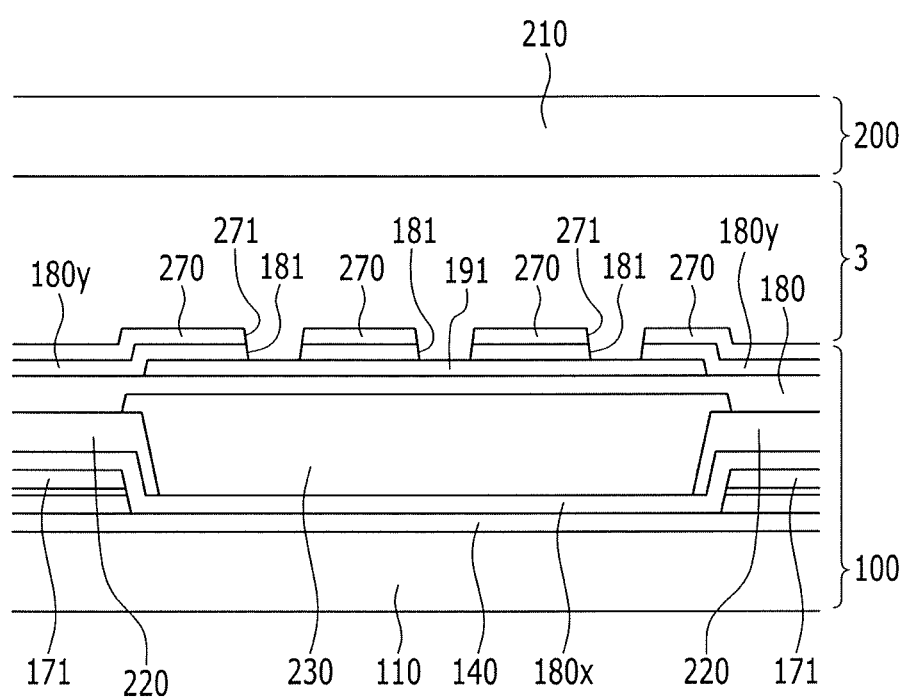
FIGS. 5A, 5B and 5C are cross-sectional views illustrating a liquid crystal display according to another exemplary embodiment of the present disclosure, which are cross-sectional views of the liquid crystal display of FIG. 1 taken along line V-V.
Figure 5B:
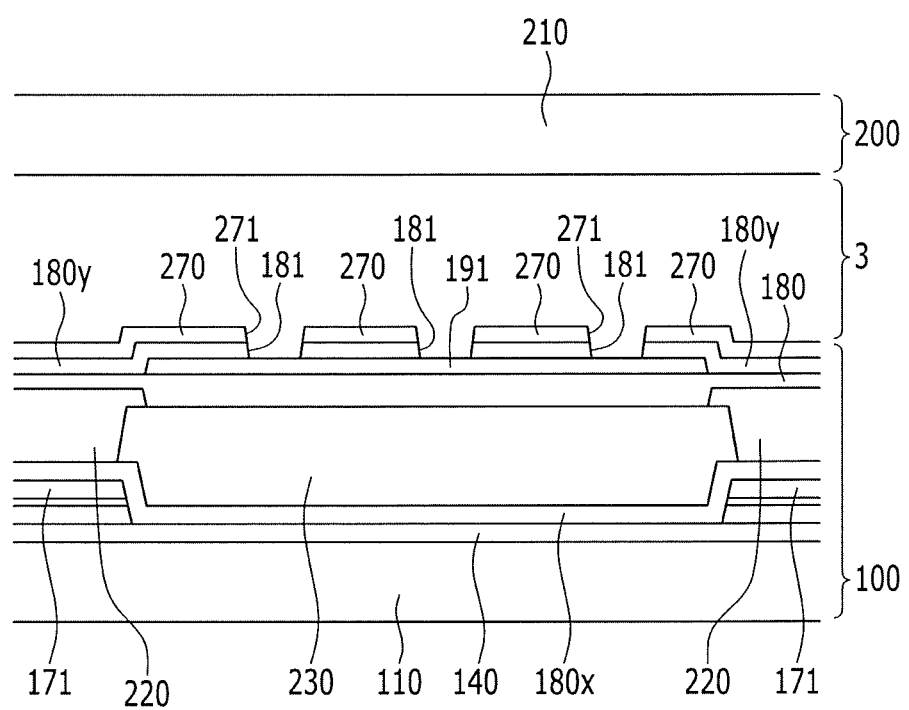
Figure 5C:
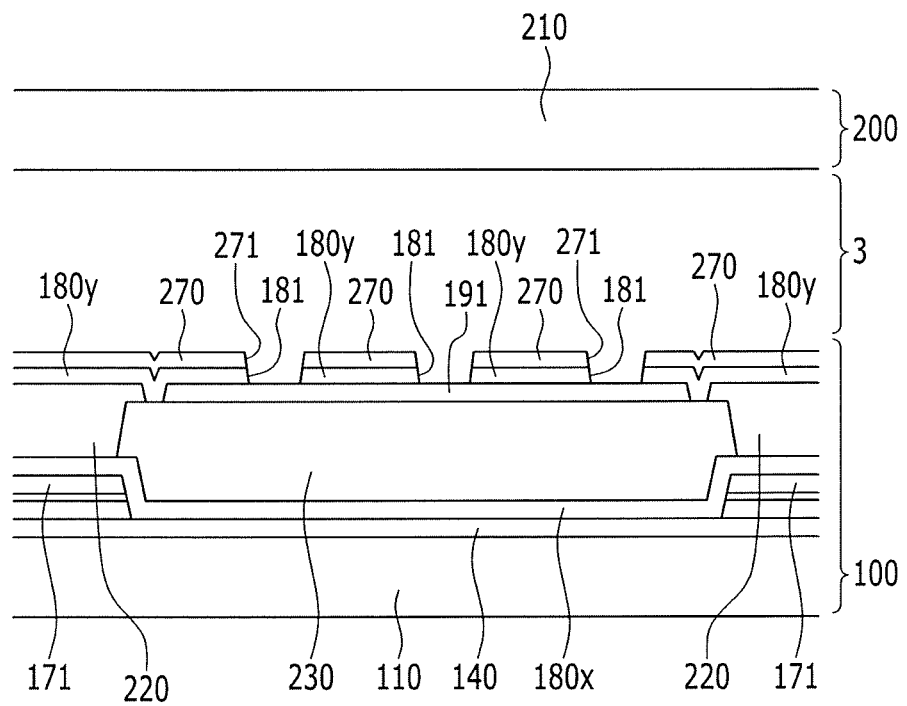

This will be described with reference to FIGS. 5A to 5C. FIGS. 5A to 5C are cross-sectional views illustrating a liquid crystal display according to another exemplary embodiment of the present disclosure, which are cross-sectional views of the liquid crystal display of FIG. 1 taken along line V-V.

Referring to FIG. 5A, the light blocking member 220 is disposed on the first passivation layer 180x of the lower panel 100. The light blocking member 220 is disposed in a region corresponding to the gate line 121 and the data line 171. A color filter 230 is disposed on the first passivation layer 180x that partially overlaps the light blocking member 220. A capping layer 180 is disposed on the light blocking member 220 and the color filter 230. The capping layer 180 prevents pigments of the light blocking member 220 and the color filter 230 from seeping into the liquid crystal layer 3.

The pixel electrode 191 is disposed on the capping layer 180, and the second passivation layer 180y and the common electrode 270 are disposed on the pixel electrode 191. The common electrode 270 and the second passivation layer 180y have first cutouts 271 and second cutouts 181, which have substantially the same planar shape. More specifically, edges of the first cutouts 271 overlap edges of the second cutouts 181.

There is no light blocking member 220 or color filter 230 disposed on the upper panel 200.

Referring to FIG. 5B, the color filter 230 is disposed on the first passivation layer 180x of the lower panel 100. The color filter 230 is disposed in a region corresponding to the pixel electrode 191. The light blocking member 220 is disposed on the color filter 230 and partially overlaps the first passivation layer 180x. The light blocking member 220 is disposed in a region corresponding to the gate line 121 and the data line 171. The capping layer 180 is disposed on the color filter 230 and the light blocking member 220. The capping layer 180 prevents pigments of the light blocking member 220 and the color filter 230 from seeping into the liquid crystal layer 3.

The pixel electrode 191 is disposed on the capping layer 180, and the second passivation layer 180y and the common electrode 270 are disposed on the pixel electrode 191. The common electrode 270 and the second passivation layer 180y have first cutouts 271 and second cutouts 181, which have substantially the same planar shape. More specifically, edges of the first cutouts 271 overlap edges of the second cutouts 181.

There is no light blocking member 220 or color filter 230 disposed on the upper panel 200.

Referring to FIG. 5C, a liquid crystal display according to an exemplary embodiment is similar to a liquid crystal display according to the exemplary embodiment illustrated in FIG. 5B.

The light blocking member 220 is disposed on the first passivation layer 180x of the lower panel 100. The light blocking member 220 is disposed in a region corresponding to the gate line 121 and the data line 171. A color filter 230 is disposed on the light blocking member 220 and partially overlaps the first passivation layer 180x.

The pixel electrode 191 is disposed on the color filter 230, and the second passivation layer 180y and the common electrode 270 are disposed on the pixel electrode 191. The common electrode 270 and the second passivation layer 180y have first cutouts 271 and second cutouts 181, which have substantially the same planar shape. More specifically, edges of the first cutouts 271 overlap edges of the second cutouts 181.

There is no light blocking member 220 or color filter 230 disposed on the upper panel 200.

In a liquid crystal display according to an exemplary embodiment, there is no capping layer 180 disposed on the light blocking member 220 and the color filter 230, unlike the liquid crystal display according to the exemplary embodiment illustrated in FIG. 5B.

Figure 6:
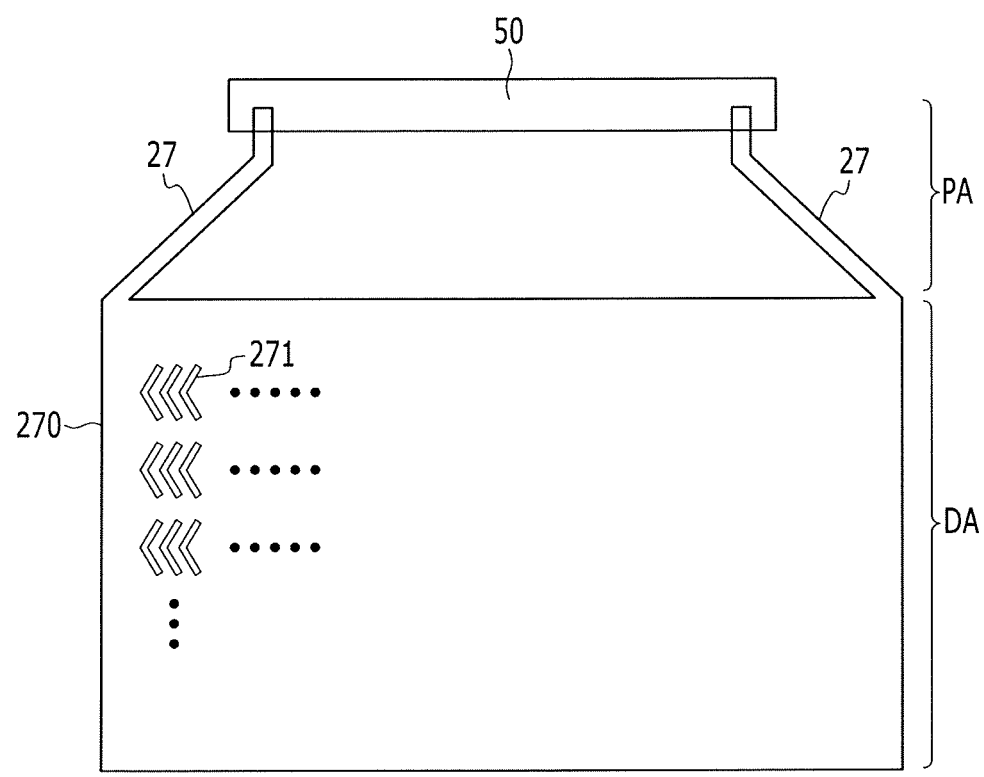
FIG. 6 is a layout view illustrating a part of a liquid crystal display according to an exemplary embodiment of the present disclosure.

A planar shape of the common electrode 270 according to an exemplary embodiment of the present disclosure will be described with reference to FIG. 6. FIG. 6 is a layout view illustrating a part of a liquid crystal display according to an exemplary embodiment of the present disclosure.

Referring to FIG. 6, a liquid crystal display according to an exemplary embodiment of the present disclosure includes a display area DA where a plurality of pixels is formed and a peripheral area PA around the display area DA, such as the liquid crystal display described with reference to FIGS. 1 to 4.

The common electrode 270 is formed in the display area DA and has a plurality of first cutouts 271 disposed in each pixel area. The plurality of first cutouts 271 is formed at positions that correspond to the pixel electrode 191 disposed in each pixel area.

In the peripheral area PA, there is disposed a common voltage applying unit 50 that applies a common voltage to the common electrode 270, and a connection portion 27 is disposed between the common voltage applying unit 50 and the common electrode 270. The common electrode 270 and the connection portion 27 may be simultaneously formed on the same layer.

Figure 7:
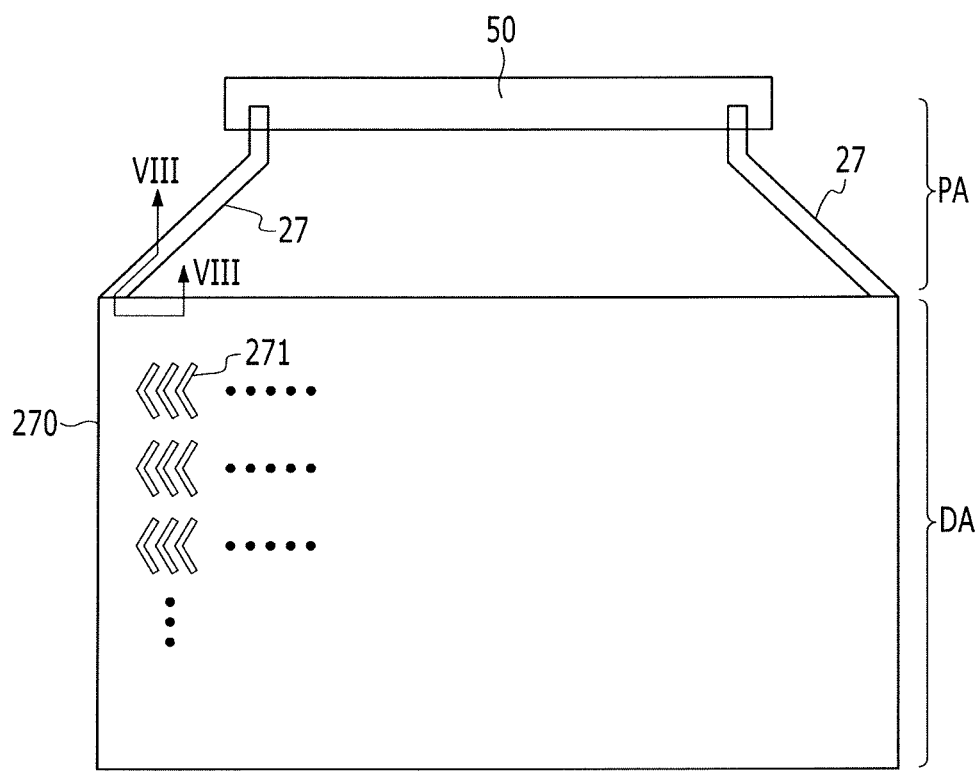
FIG. 7 is a layout view illustrating a part of a liquid crystal display according to another exemplary embodiment of the present disclosure.

The common electrode 270 according to an exemplary embodiment of the present disclosure will be described in more detail with reference to FIGS. 7 and 8. FIG. 7 is a layout view illustrating a part of a liquid crystal display according to another exemplary embodiment of the present disclosure, and FIG. 8 is a cross-sectional view of the liquid crystal display of FIG. 7 taken along line VIII-VIII.

Figure 8:
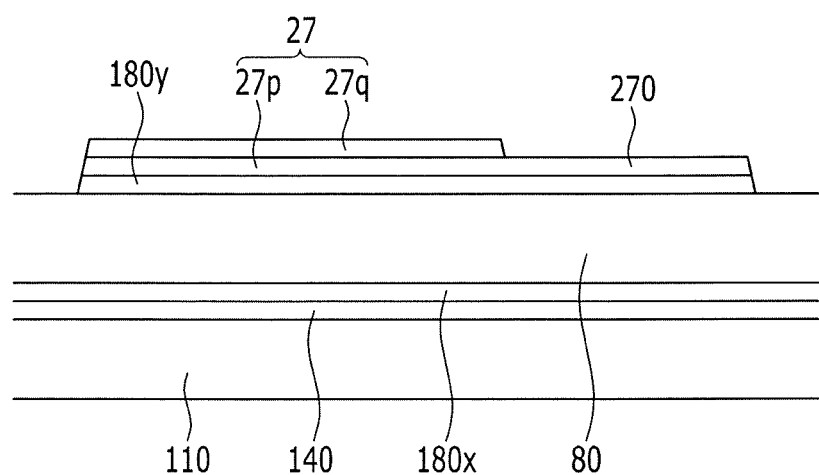
FIG. 8 is a cross-sectional view of the liquid crystal display of FIG. 7 taken along line VIII-VIII.

Referring to FIGS. 7 and 8, a liquid crystal display according to an exemplary embodiment of the present disclosure includes a display area DA where a plurality of pixels is formed and a peripheral area PA around the display area DA, such as the liquid crystal display described with reference to FIGS. 1 to 4.

The common electrode 270 is formed in the display area DA and has a plurality of first cutouts 271 disposed in each pixel area. The plurality of first cutouts 271 is formed at positions corresponding to the pixel electrode 191 disposed in each pixel area.

The common voltage applying unit 50 is disposed in the peripheral area PA and applies a common voltage to the common electrode 270, and the connection portion 27 is disposed between the common voltage applying unit 50 and the common electrode 270. The connection portion 27 includes a lower connection portion 27p formed with the same layer as the common electrode 270, and an upper connection portion 27q disposed on the lower connection portion 27p.

The lower connection portion 27p of the connection portion 27 includes a transparent conductor like the common electrode 270, and the upper connection portion 27q of the connection portion 27 includes a low resistance metal.

By forming the connection portion 27 connecting the common voltage applying unit 50 to the common electrode 270 with a double layer that includes the lower connection portion 27p and the upper connection portion 27q, the common voltage applied from the common voltage applying unit 50 may be transferred to the common electrode 270 without a signal delay.

The second passivation layer 180y, the common electrode 270, and the connection portion 27 may be formed by using one photomask.

Figure 9:
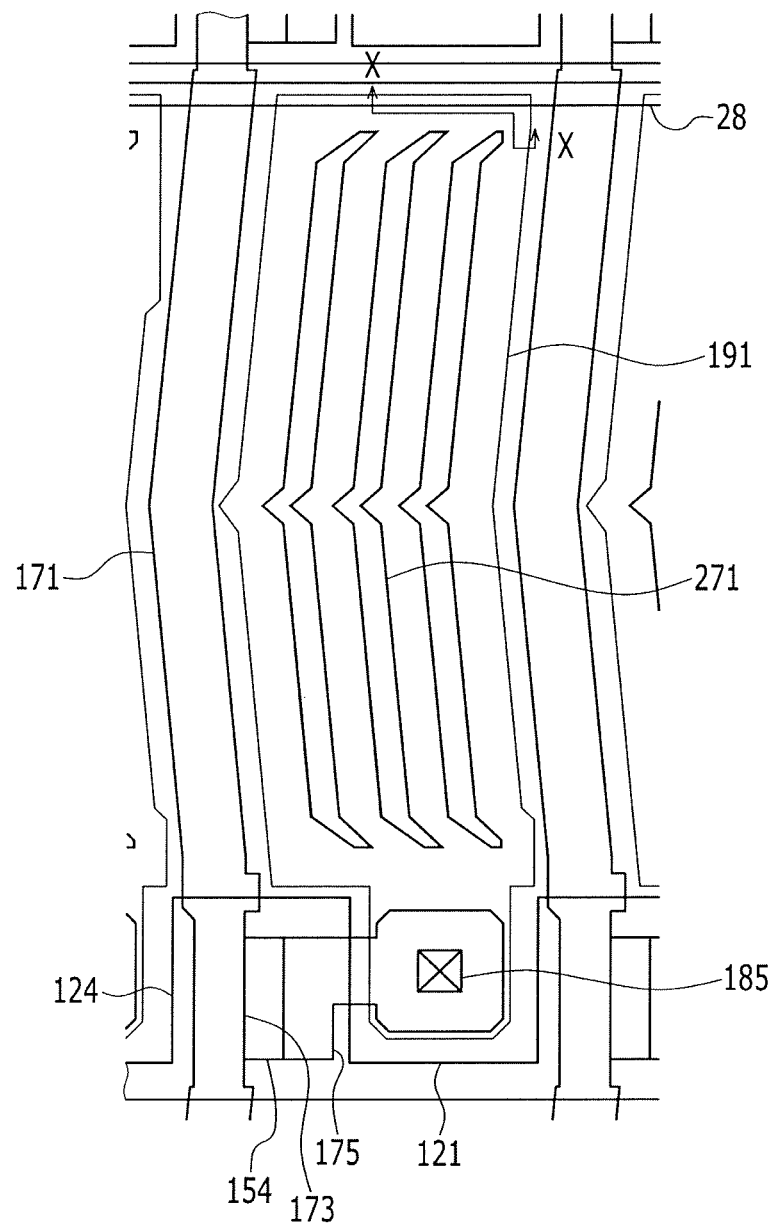
FIG. 9 is a layout view illustrating a liquid crystal display according to another exemplary embodiment of the present disclosure.

A liquid crystal display according to another exemplary embodiment of the present disclosure will be described with reference to FIGS. 9 and 10. FIG. 9 is a layout view illustrating a liquid crystal display according to another exemplary embodiment of the present disclosure, and FIG. 10 is a cross-sectional view of the liquid crystal display of FIG. 9 taken along line X-X.

Figure 10:
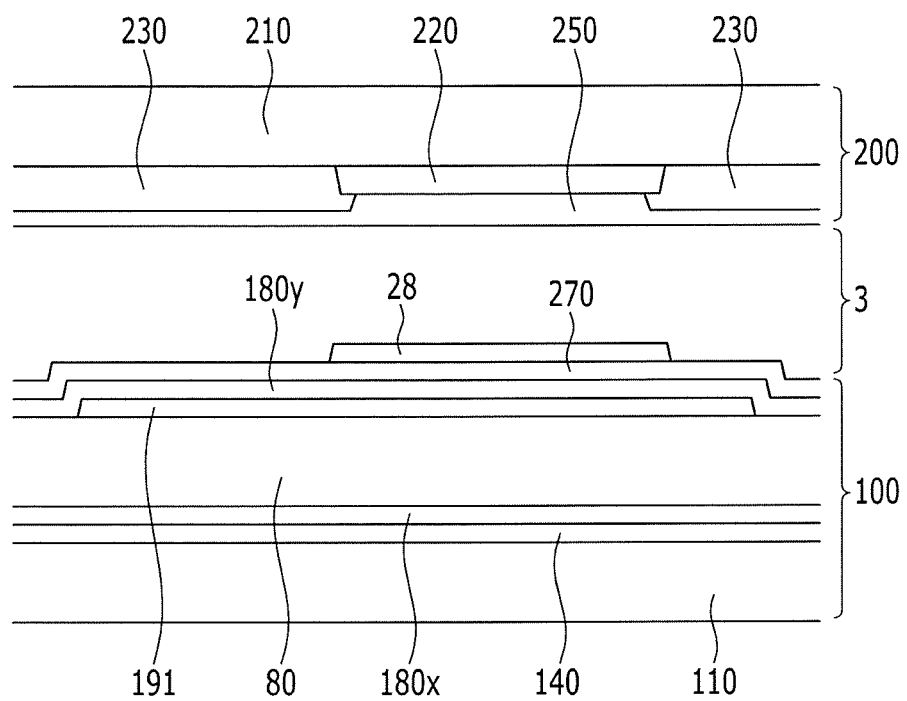
FIG. 10 is a cross-sectional view of the liquid crystal display of FIG. 9 taken along line X-X.

Referring to FIGS. 9 and 10, a liquid crystal display according to an exemplary embodiment is similar to the liquid crystal display according to an exemplary embodiment illustrated in FIGS. 1 to 4.

A liquid crystal display according to another exemplary embodiment of the present disclosure includes a lower panel 100 and an upper panel 200 facing each other, and a liquid crystal layer 3 interposed between the two panels 100 and 200.

First, the lower panel 100 will be described.

A gate line 121 that includes a gate electrode 124 is disposed on a first insulation substrate 110, and a gate insulating layer 140 is formed on the gate line 121.

A semiconductor layer 154 is formed on the gate insulating layer 140. Ohmic contacts (not shown) are formed on the semiconductor 154. If the semiconductor 154 is an oxide semiconductor, the ohmic contacts 163 and 165 may be omitted.

A data line 171 that includes a source electrode 173 and a drain electrode 175 is disposed on the ohmic contacts and the gate insulating layer 140.

The data line 171 may have a first curved portion having a curved shape to maximize transmittance of the liquid crystal display, and the curved portion may have a V-letter shape whose vertex is in a middle region of a pixel area. A second curved portion that forms a predetermined angle with the first curved portion may be further included in the middle region of the pixel area.

A first passivation layer 180x is disposed on the data conductors 171, 173, and 175, the gate insulating layer 140, and an exposed portion of the semiconductor 154. The first passivation layer 180x may include an organic insulating material or an inorganic insulating material.

An organic layer 80 is disposed on the first passivation layer 180x. The organic layer 80 has a thickness greater than that of the first passivation layer 180x and may have a flat upper surface.

As described with reference to FIGS. 5A to 5C, the organic layer 80 may be a color filter 230.

The organic layer 80 and the first passivation layer 180x have a third contact hole 185 formed therethrough.

A pixel electrode 191 is formed on the organic layer 80. The pixel electrode 191 includes a curved edge which is substantially parallel with the first curved portion and the second curved portion of the data line 171.

The pixel electrode 191 is physically and electrically connected with the drain electrode 175 through the first contact hole 185 to receive a voltage from the drain electrode 175.

A second passivation layer 180y is formed on the pixel electrode 191, and a common electrode 270 is formed on the second passivation layer 180y.

The second passivation layer 180y and the common electrodes 270 have substantially the same planar shape.

The common electrode 270 has a plurality of first cutouts 271, and the second passivation layer 180y has a plurality of second cutouts (not shown). The first cutouts 271 and the second cutouts have the same planar shape. More specifically, edges of the first cutouts 271 overlap edges of the second cutouts 181.

A common voltage line 28 is disposed on the common electrode 270. The common voltage line 28 may include a low resistance metal to prevent a signal delay of the common electrode 270.

In a liquid crystal display according to an exemplary embodiment, the common voltage line 28 extends parallel to the gate line 121, but in a liquid crystal display according to another exemplary embodiment of the present disclosure, the common voltage line 28 may extend parallel to the data line 171. In this case, two pixel electrodes 191 may be disposed between two adjacent data lines 171, and the common voltage line 28 may be disposed between the two adjacent data lines 171 and the two pixel electrodes 191, to prevent light leakage between the two pixel electrodes 191.

In a liquid crystal display according to an exemplary embodiment, like the liquid crystal display according to the exemplary embodiment illustrated in FIGS. 7 and 8, the connection portion 27 between the common voltage 270 and the common voltage applying unit 50 may include a lower connection portion 27p and an upper connection portion 27q disposed on the lower connection portion 27p.

The common voltage line 28 may be formed from the same layer as the upper connection portion 27q of the connection portion 27.

That is, the common electrode 270 and the lower connection portion 27p of the connection portion 27 may be formed from the same layer, and the common voltage line 28 and the upper connection portion 27q of the connection portion 27 may be formed from the same layer.

Although not illustrated, an alignment layer is disposed on portions of the pixel electrode 191 that are exposed by the first cutouts 271 and second cutouts 181.

The upper panel 200 will be described.

A light blocking member (not shown in FIG. 10) and a plurality of color filters 230 are formed on a second insulation substrate 210. An overcoat 250 is formed on the color filter 230 and the light blocking member. An alignment layer may be disposed on the overcoat 250.

As described above, if the organic layer 80 is a color filter, the color filter 230 of the upper panel 200 may be omitted. Further, the light blocking member of the upper panel 200 may also be formed on the lower panel 100.

The liquid crystal layer 3 includes a liquid crystal material having positive dielectric anisotropy. The liquid crystal molecules of the liquid crystal layer 3 are aligned so that directions of long axes thereof are parallel to surfaces of the panels 100 and 200, and the direction has a 90° twisted spiral structure from a rubbing direction of the alignment layer up to the upper panel 200.

The pixel electrode 191 receives a data voltage from the drain electrode 175, and the common electrode 270 receives a common voltage having a predetermined magnitude from a common voltage applying unit disposed outside of the display area.

The pixel electrode 191 and the common electrode 270 are field generating electrodes that generate an electric field, and thus the liquid crystal molecules disposed on the two electrodes 191 and 270 rotate in a direction parallel to the direction of the electric field. As such, polarization of light passing through the liquid crystal layer varies according to the rotation directions of the liquid crystal molecules.

In a liquid crystal display according to an exemplary embodiment of the present disclosure, the second passivation layer 180y and the common electrodes 270 have substantially the same planar shape. In more detail, the common electrode 270 has a plurality of first cutouts 271, the second passivation layer 180y has a plurality of second cutouts, and the first cutouts 271 and the second cutouts have substantially the same planar shape. More specifically, edges of the first cutouts 271 overlap edges of the second cutouts 181.

Further, the lower connection portion 27p of the connection portion 27 is formed from the same layer as the common electrode 270, and the common voltage line 28 is formed from the same layer as the upper connection portion 27q of the connection portion 27. Further, the second passivation layer 180y, the common electrode 270, the connection portion 27, and the common voltage line 28 may be simultaneously formed by using one photomask.

Accordingly, an increase in the manufacturing cost of a liquid crystal display may be prevented and a signal delay of the common electrode 270 may be prevented.

Many features of the liquid crystal displays according to the exemplary embodiments described with reference to FIGS. 1 to 4, 5A to 5C, 6, 7, and 8 may be applied to a liquid crystal display according to the exemplary embodiment.

Figure 11:
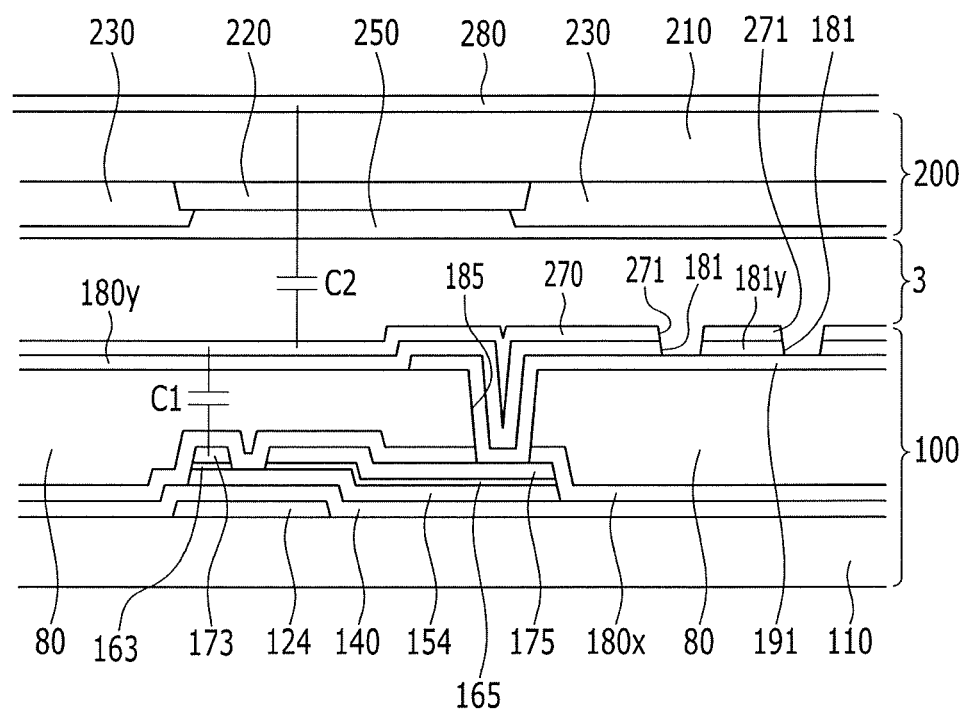
FIG. 11 is a cross-sectional view illustrating a part of a liquid crystal display device according to another exemplary embodiment of the present disclosure, which is a cross-sectional view of the liquid crystal display of FIG. 1 taken along line II-II.
Figure 12:
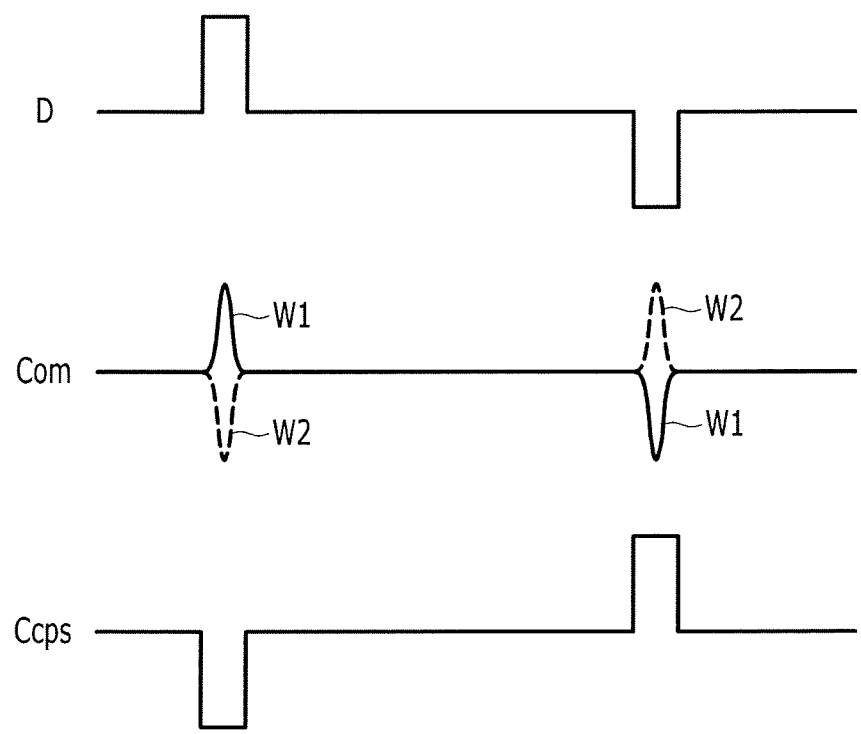
FIG. 12 is a waveform diagram of some signals applied to the liquid crystal display of FIG. 11.

A liquid crystal display according to another exemplary embodiment of the present disclosure will be described with reference to FIGS. 11 and 12. FIG. 11 is a cross-sectional view illustrating a part of a liquid crystal display device according to another exemplary embodiment of the present disclosure, and FIG. 12 is a waveform diagram of some signals applied to the liquid crystal display of FIG. 11.

Referring to FIG. 11, a liquid crystal display according to an exemplary embodiment further includes a compensation electrode 280 disposed on an outer surface of the upper panel 200.

The common electrode 270 disposed on the lower panel 200 overlaps the data line 171 to form a first capacitor C1, and the common electrode 270 forms a second capacitor C2 together with the compensation electrode 280.

A voltage having a polarity opposite to that of the data voltage applied to the data line 171 is applied to the compensation electrode 280 to compensate for the coupling between the data line 171 and the common electrode 270.

This will be described in more detail with reference to FIG. 12.

Referring to FIG. 12, the data line 171 and the common electrode 270 overlap each other to form a first capacitor C1. Accordingly, a common voltage Vcom of the common electrode 270, to which a predetermined of voltage is applied, may change by a first magnitude W1 by coupling with a data voltage D applied to the data line 171. In this case, a compensation voltage Ccps having opposite polarity is applied from the compensation electrode 280 to the data voltage D applied to the data line 171.

The compensation electrode 280 and the common electrode 270 overlap each other to form a second capacitor C2. Accordingly, the common voltage Vcom of the common electrode 270 may change by a second magnitude W2, by coupling with the compensation electrode 280. That is, by applying a voltage having a polarity opposite to that of the data voltage D to the compensation electrode 280, the first magnitude change W1 of the common voltage Vcom due to the data voltage D is compensated by coupling with the compensation voltage Ccps to uniformly maintain the magnitude of the common voltage Vcom.

Many features of the liquid crystal displays according to exemplary embodiments described with reference to FIGS. 1 to 4, 5A to 5C, 6, 7, 8, 9, and 10 described above may be applied to a liquid crystal display according to an exemplary embodiment.

Figure 13:
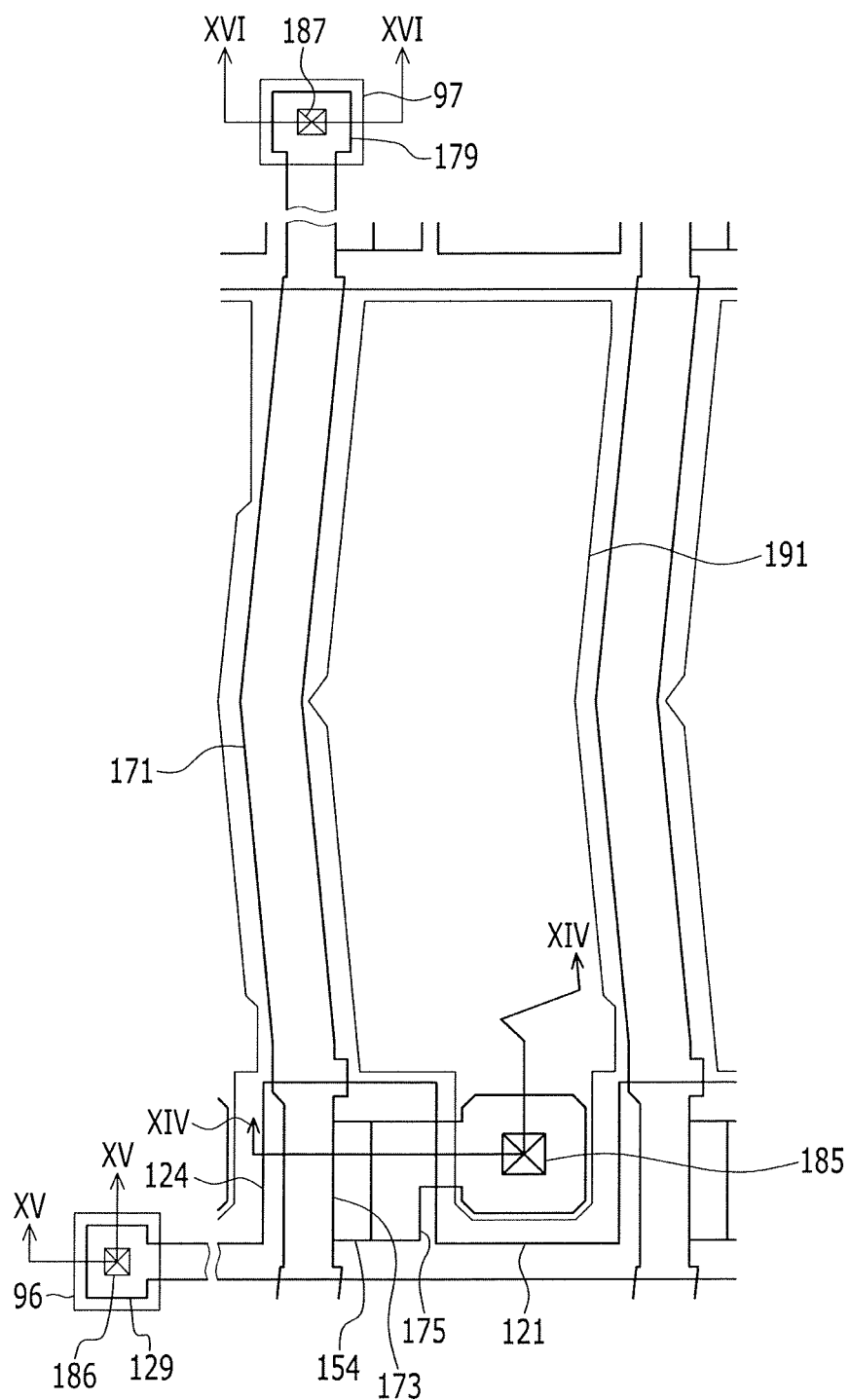
FIG. 13 is a layout view illustrating a part of a manufacturing method of a liquid crystal display according to an exemplary embodiment of the present disclosure.
Figure 14:
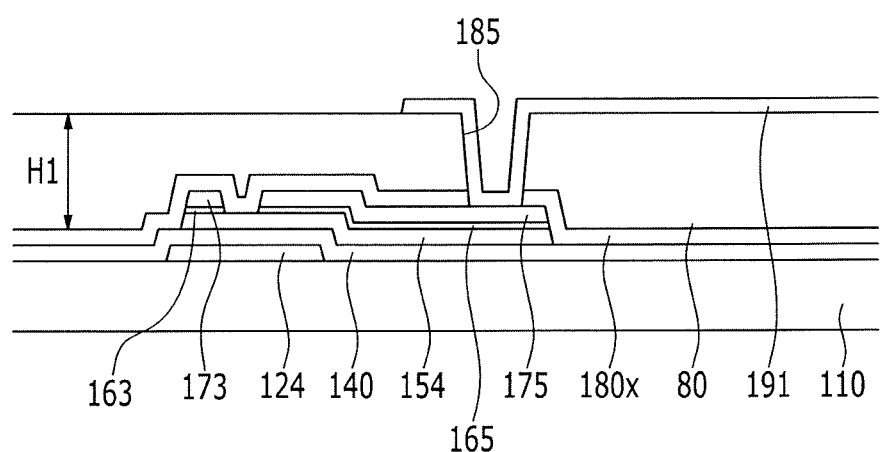
FIG. 14 is a cross-sectional view of the liquid crystal display of FIG. 13 taken along line XIV-XIV.
Figure 15:
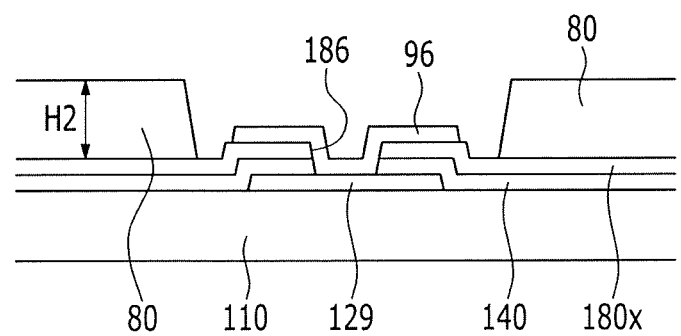
FIG. 15 is a cross-sectional view of the liquid crystal display of FIG. 13 taken along line XV-XV.
Figure 16:
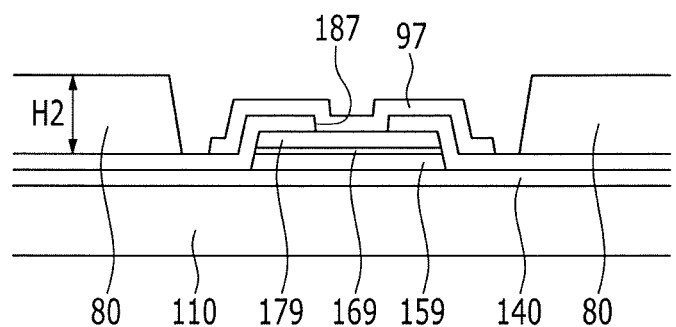
FIG. 16 is a cross-sectional view of the liquid crystal display of FIG. 13 taken along line XVI-XVI.
Figure 17:
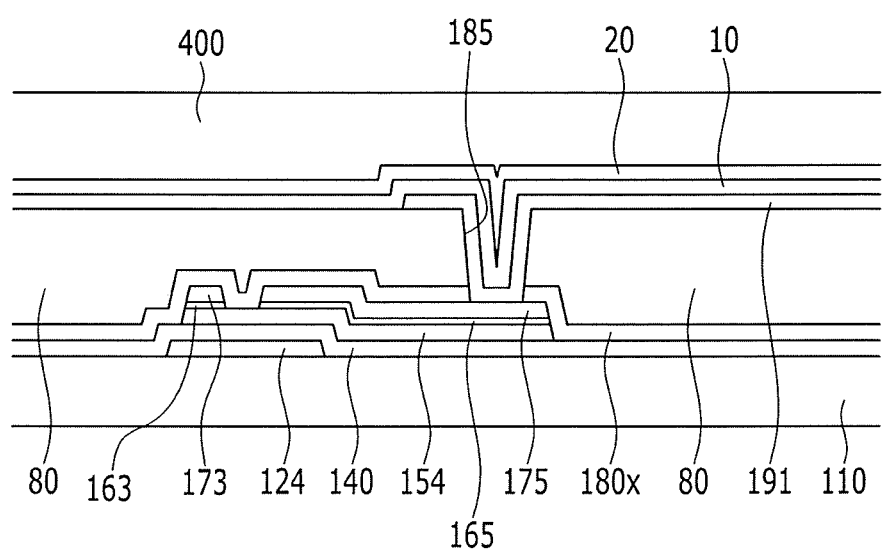
FIGS. 17, 20, and 23 are cross-sectional views sequentially illustrating a manufacturing method of a liquid crystal display according to an exemplary embodiment of the present disclosure, which are cross-sectional views of the liquid crystal display of FIG. 1 taken along line II-II.
Figure 18:
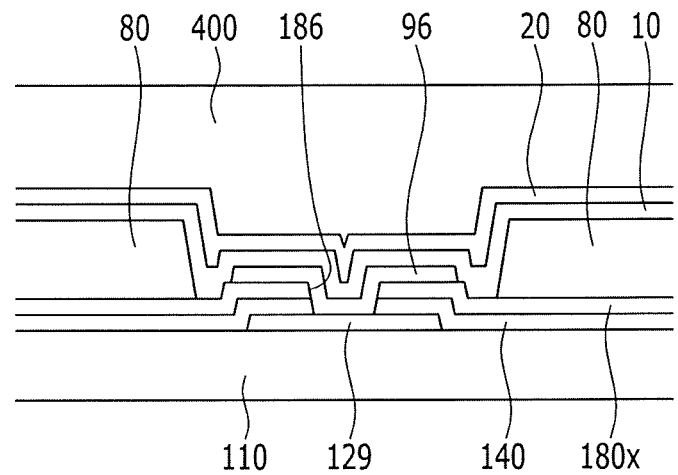
FIGS. 18, 21, and 24 are cross-sectional views sequentially illustrating a manufacturing method of a liquid crystal display according to an exemplary embodiment of the present disclosure, which are cross-sectional views of the liquid crystal display of FIG. 1 taken along line III-III.
Figure 19:
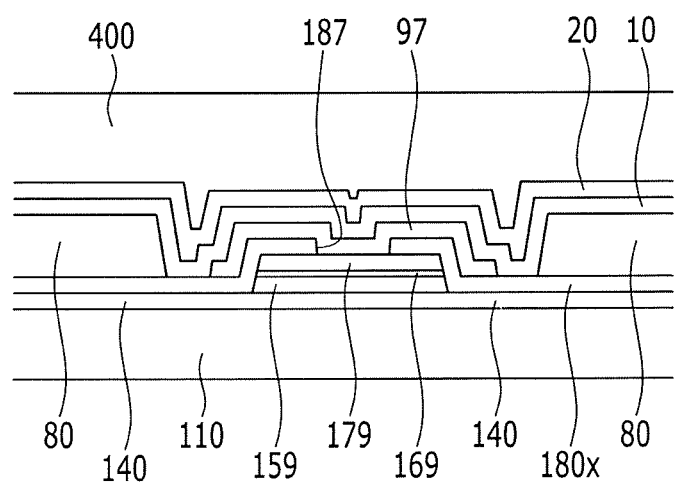
FIGS. 19, 22, and 25 are cross-sectional views sequentially illustrating a manufacturing method of a liquid crystal display according to an exemplary embodiment of the present disclosure, which are cross-sectional views of the liquid crystal display of FIG. 1 taken along line IV-IV.
Figure 20:
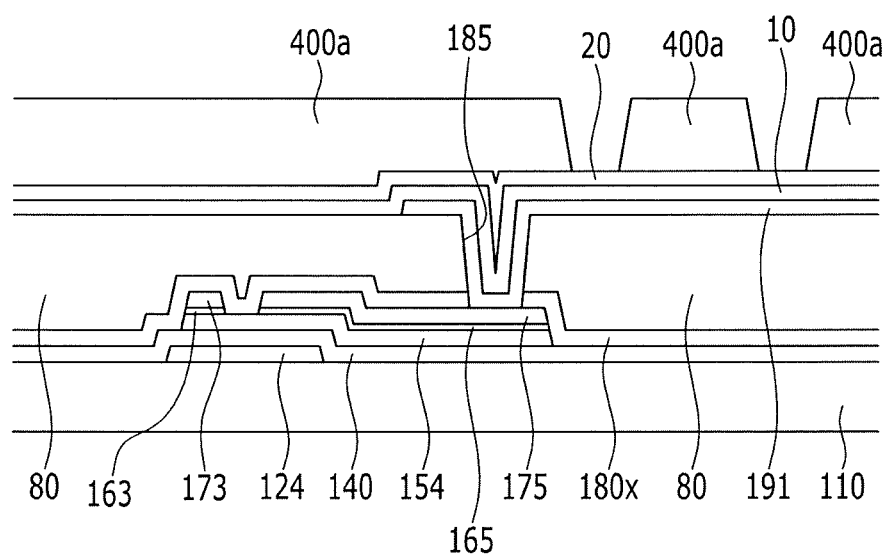
Figure 21:
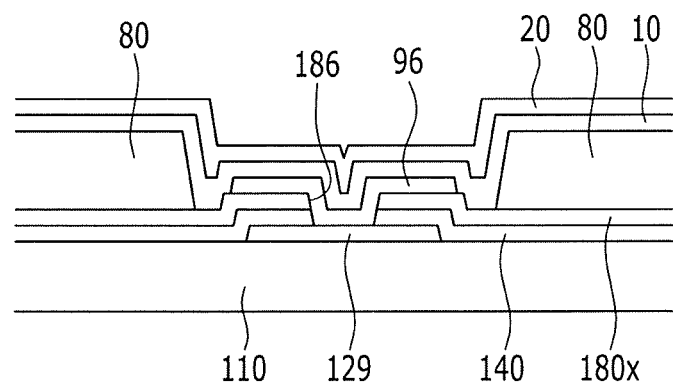
Figure 22:
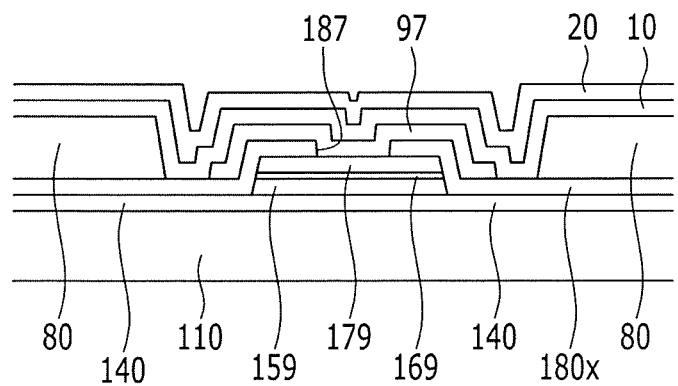
Figure 23:
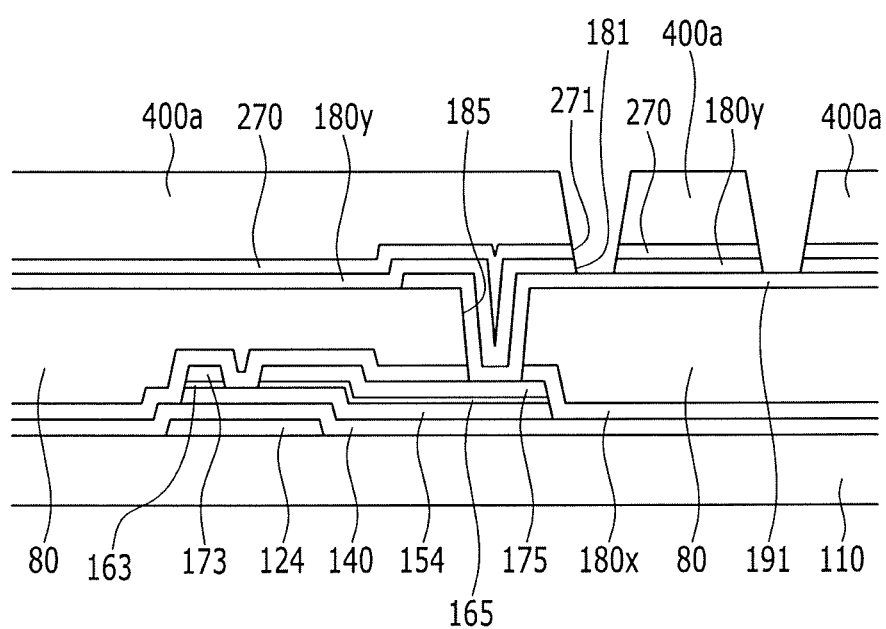
Figure 24:
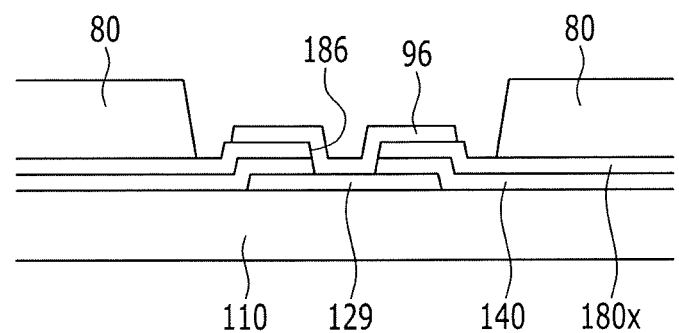
Figure 25:
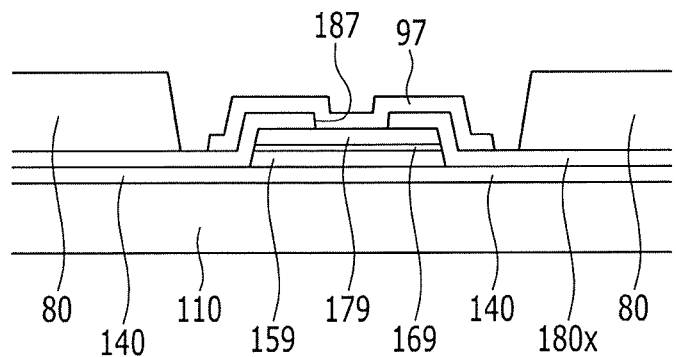
Figure 26:
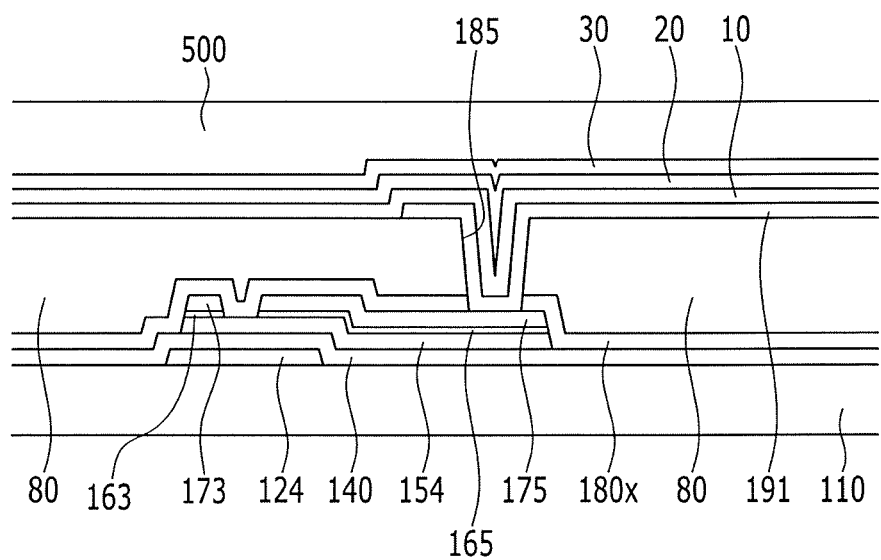
FIGS. 26, 31, 36, 41, 46, and 51 are cross-sectional views sequentially illustrating a manufacturing method of a liquid crystal display according to another exemplary embodiment of the present disclosure, which are cross-sectional views of the liquid crystal display of FIG. 13 taken along line XIV-XIV.
Figure 27:
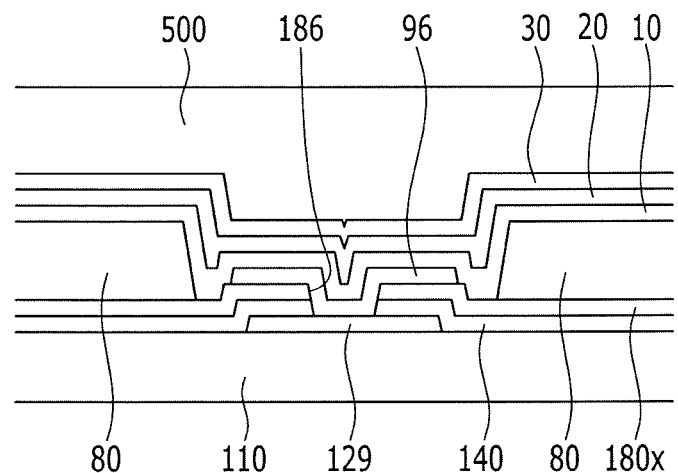
FIGS. 27, 32, 37, 42, 47, and 52 are cross-sectional views sequentially illustrating a manufacturing method of a liquid crystal display according to another exemplary embodiment of the present disclosure, which are cross-sectional views of the liquid crystal display of FIG. 13 taken along line XV-XV.
Figure 28:
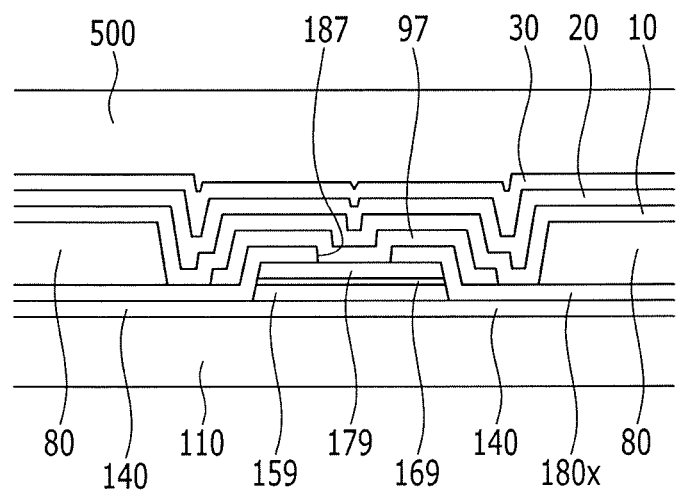
FIGS. 28, 33, 38, 43, 48, and 53 are cross-sectional views sequentially illustrating a manufacturing method of a liquid crystal display according to another exemplary embodiment of the present disclosure, which are cross-sectional views of the liquid crystal display of FIG. 13 taken along line XVI-XVI.
Figure 29:
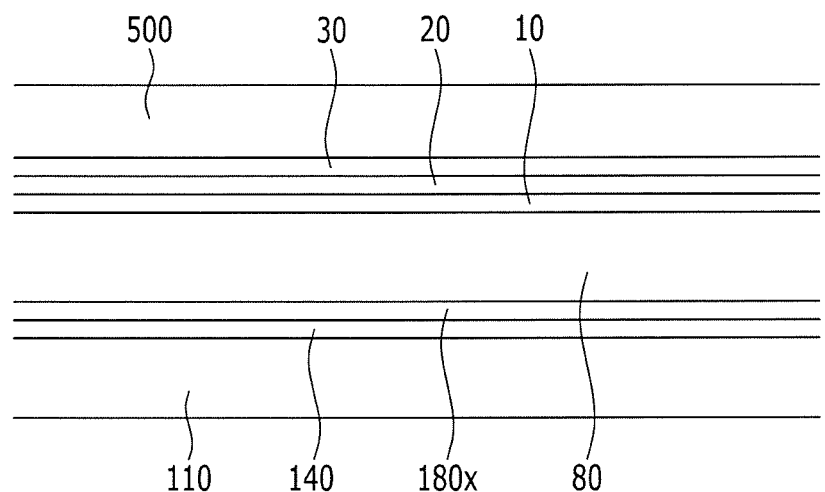
FIGS. 29, 34, 39, 44, 49, and 54 are cross-sectional views sequentially illustrating a manufacturing method of a liquid crystal display according to another exemplary embodiment of the present disclosure, which are cross-sectional views of the liquid crystal display of FIG. 9 taken along line X-X.
Figure 30:
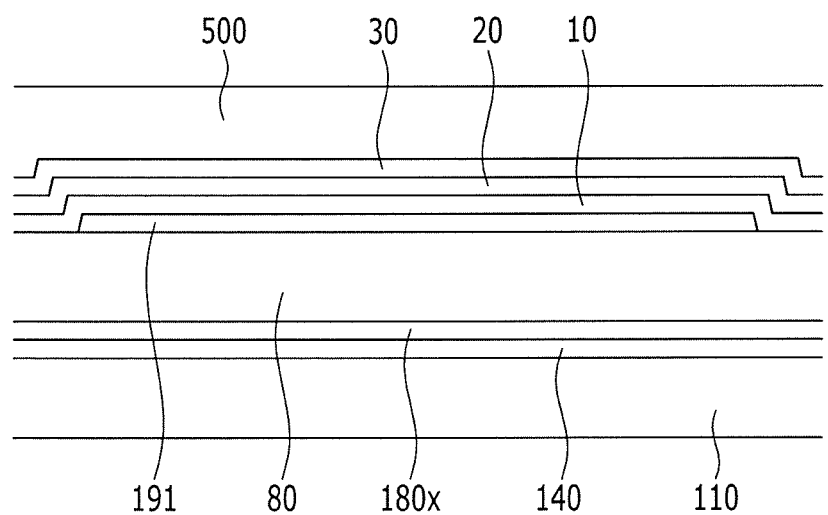
FIGS. 30, 35, 40, 45, 50, and 55 are cross-sectional views sequentially illustrating a manufacturing method of a liquid crystal display according to another exemplary embodiment of the present disclosure, which are cross-sectional views of the liquid crystal display of FIG. 7 taken along line VIII-VIII.
Figure 31:
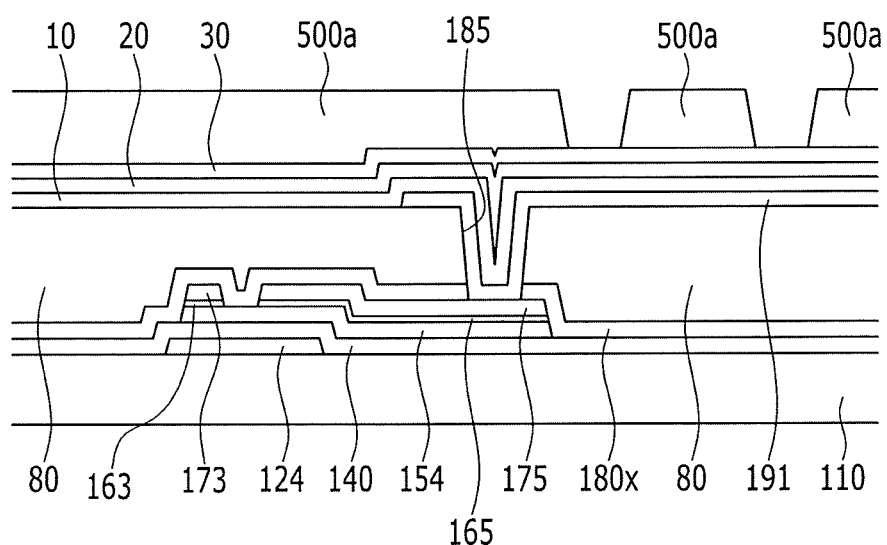
Figure 32:
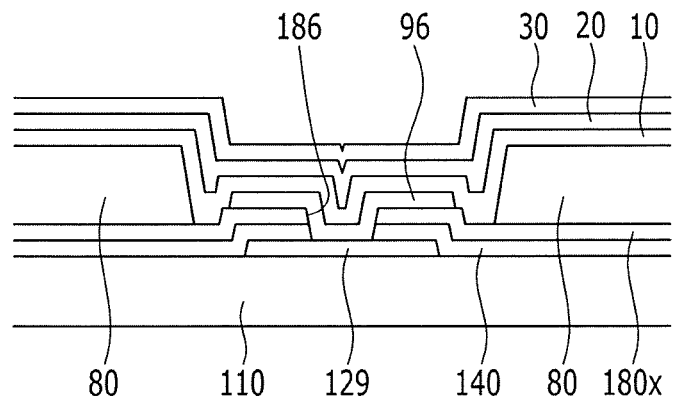
Figure 33:
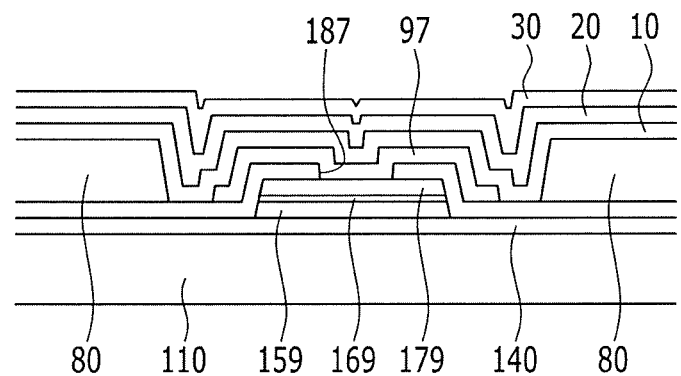
Figure 34:
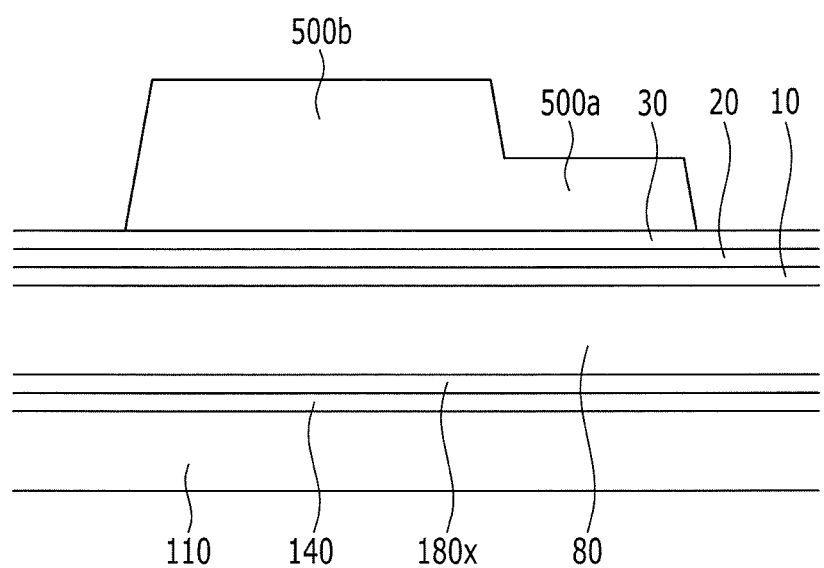
Figure 35:
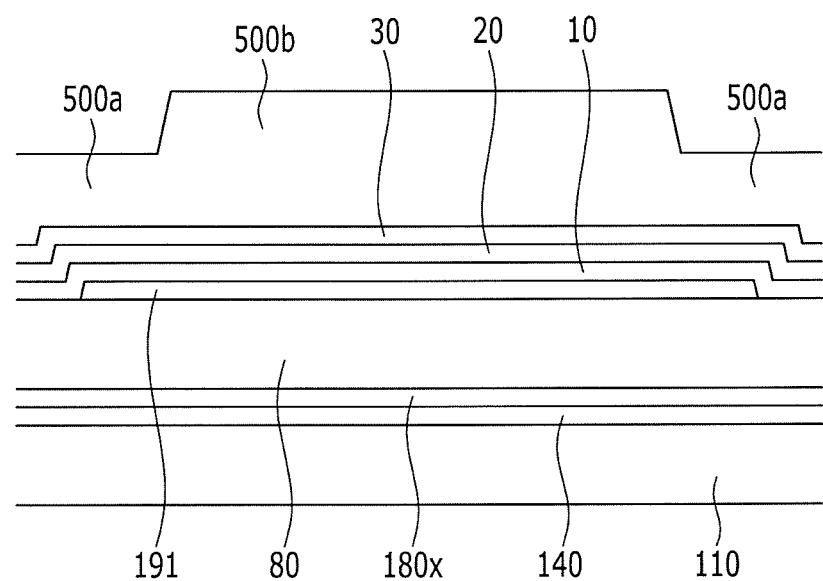
Figure 36:
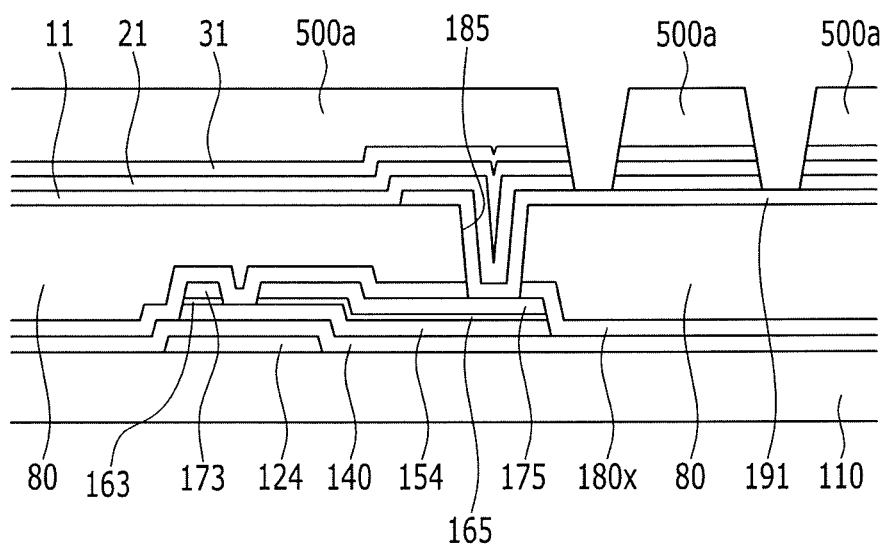
Figure 37:
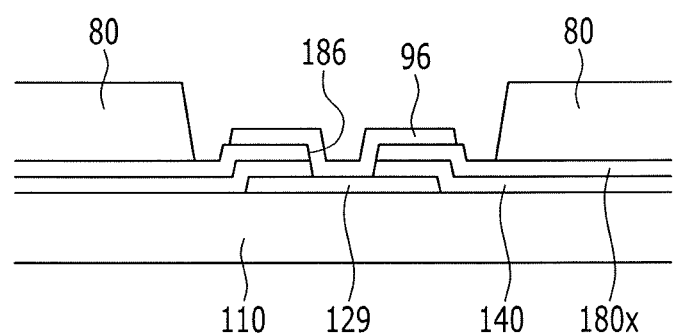
Figure 38:
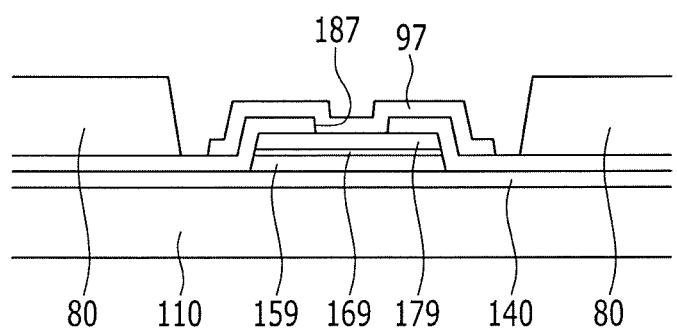
Figure 39:
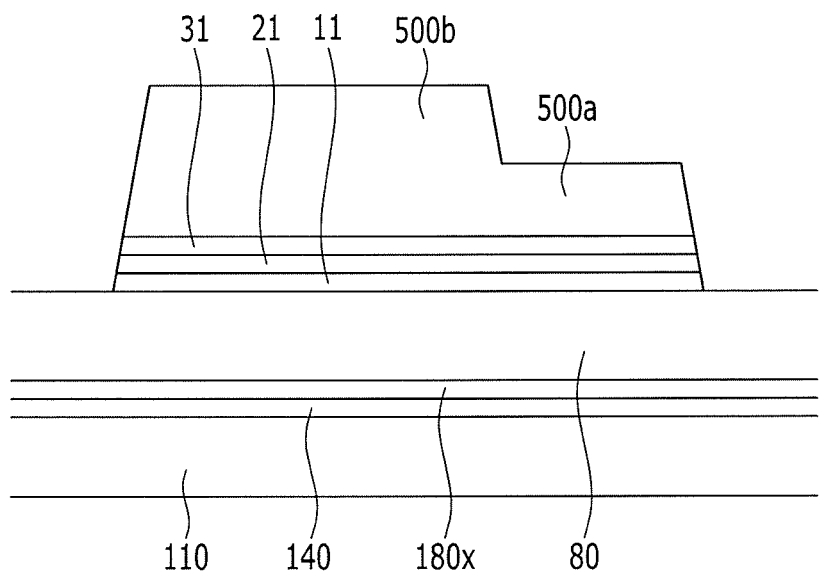
Figure 40:
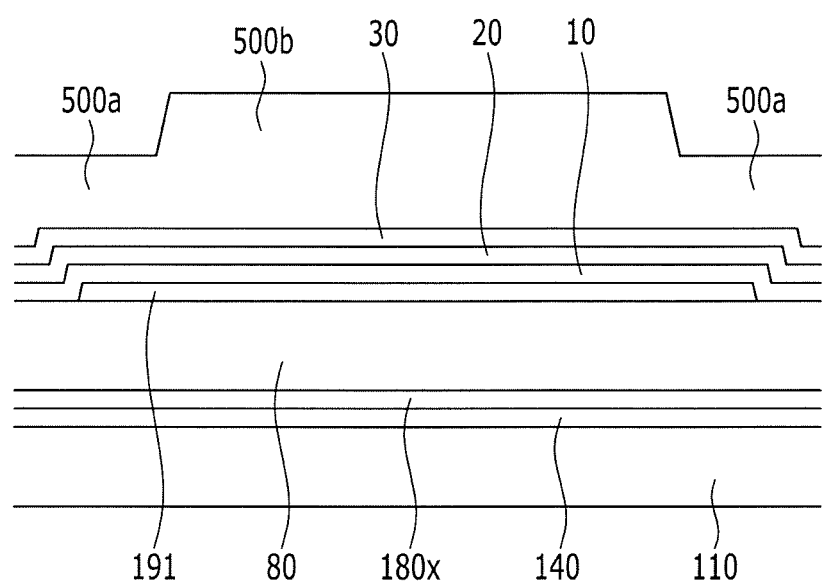
Figure 41:
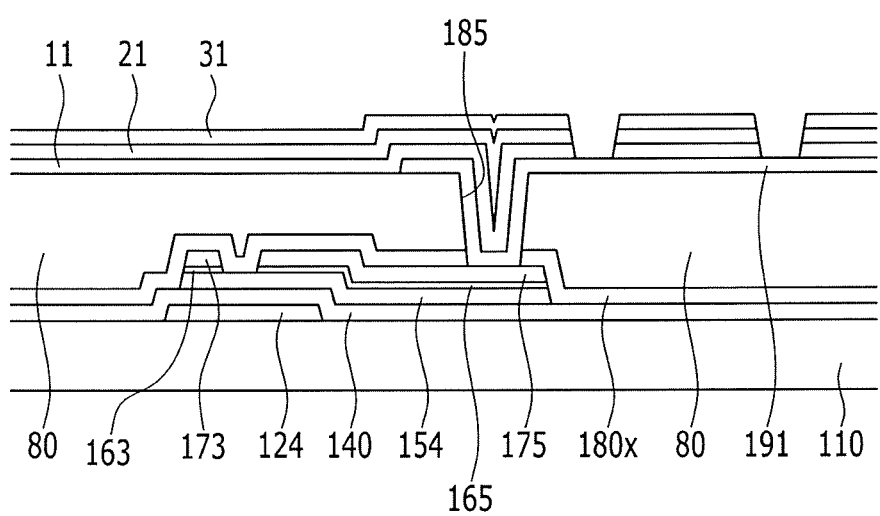
Figure 42:
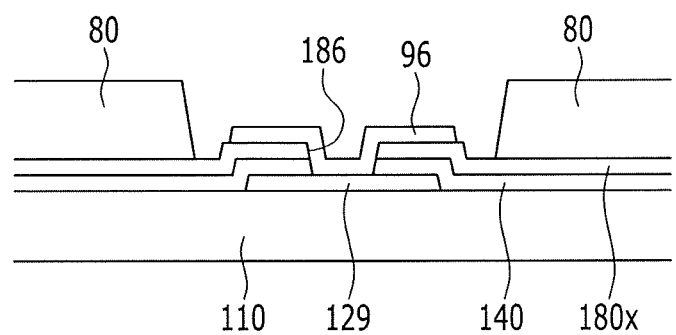
Figure 43:
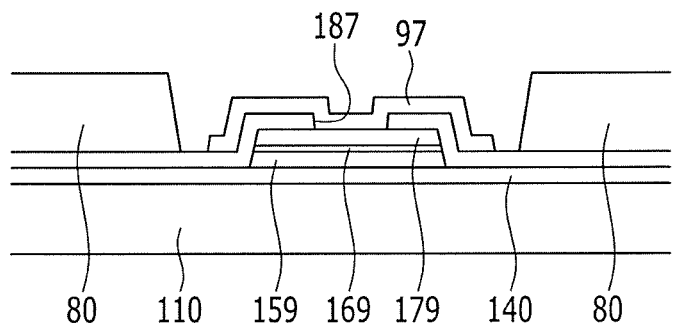
Figure 44:
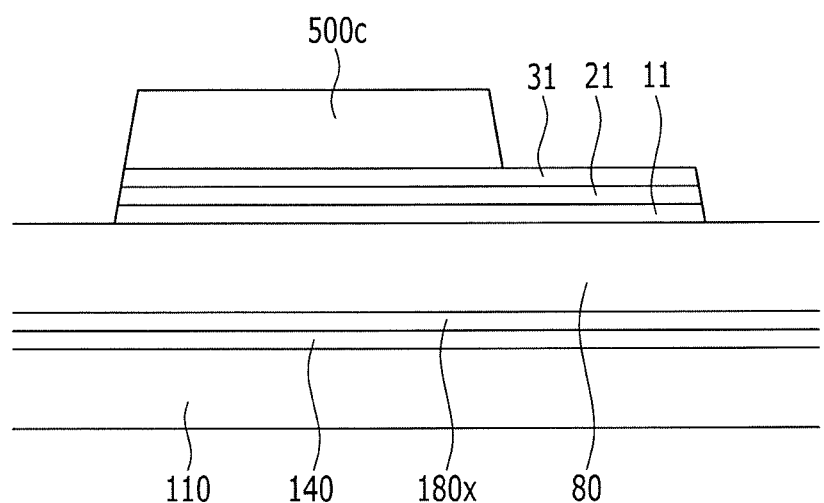
Figure 45:
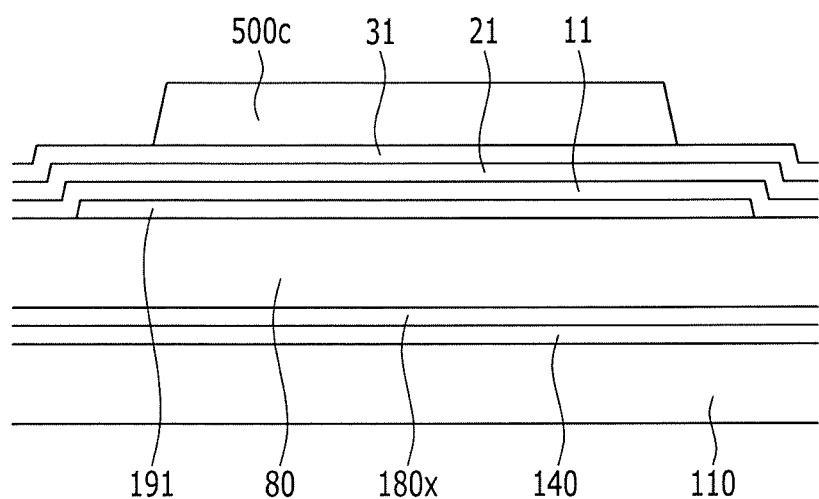
Figure 46:
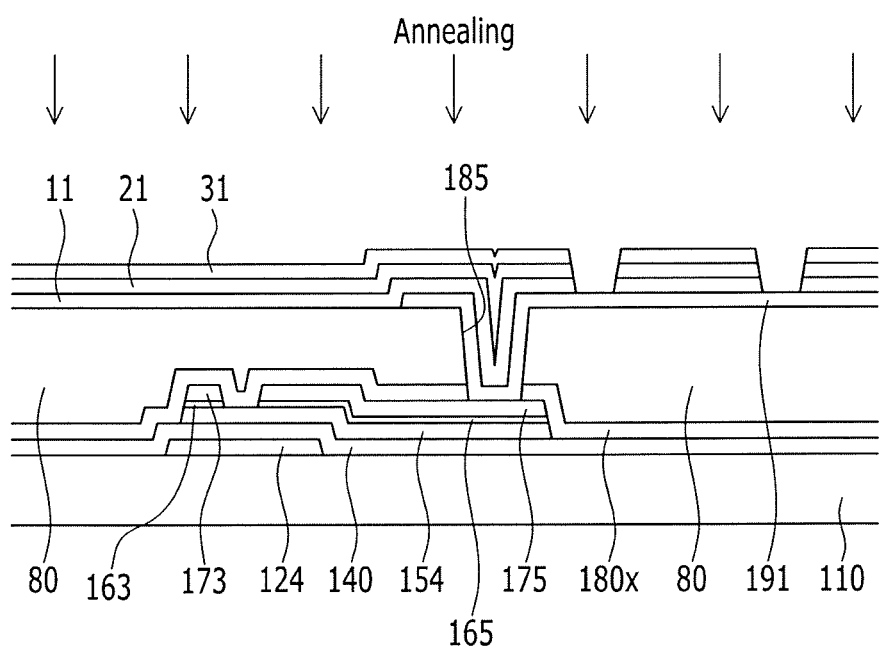
Figure 47:
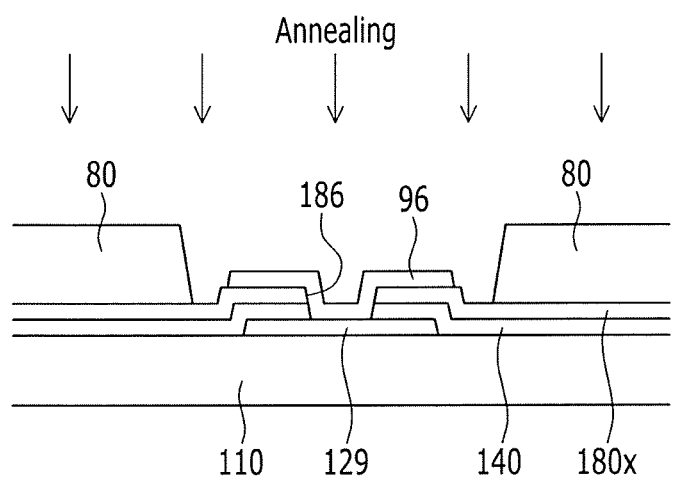
Figure 48:
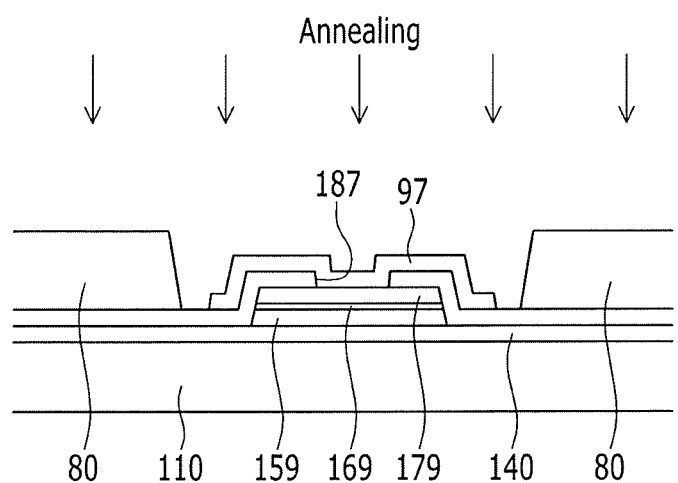
Figure 49:
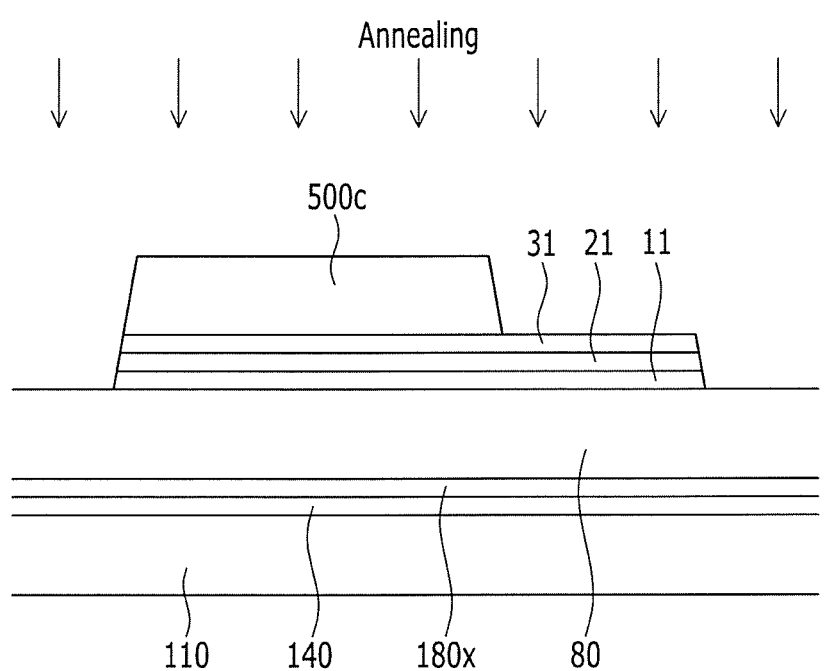
Figure 50:
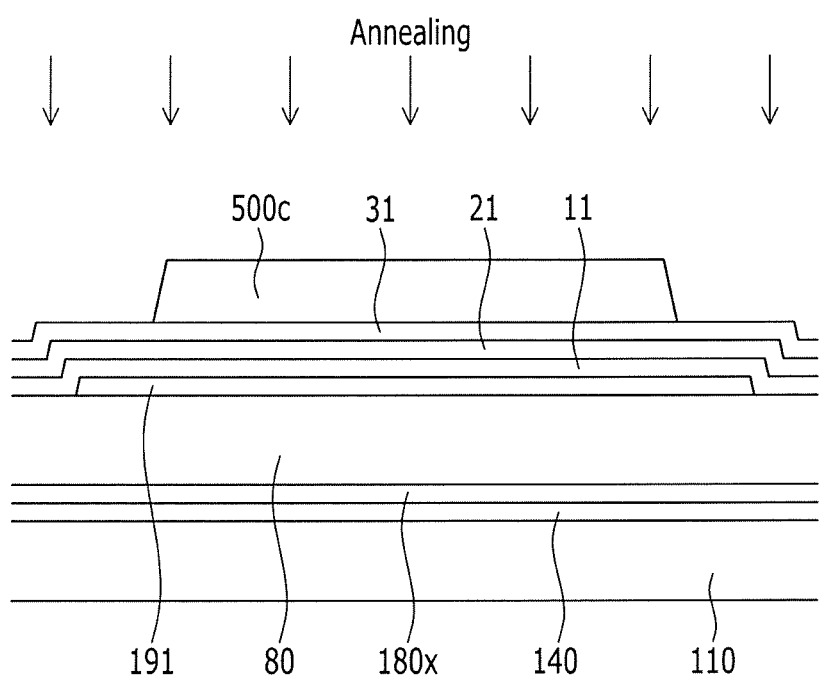
Figure 51:
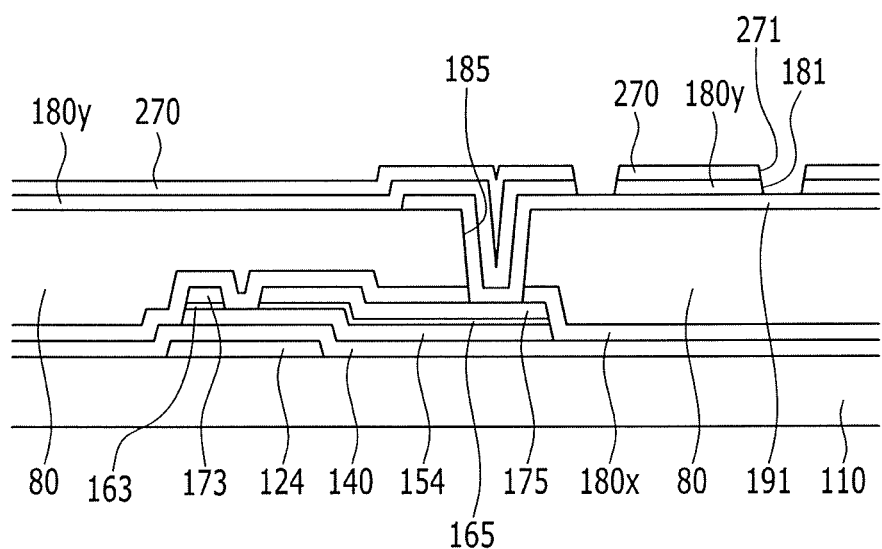
Figure 52:
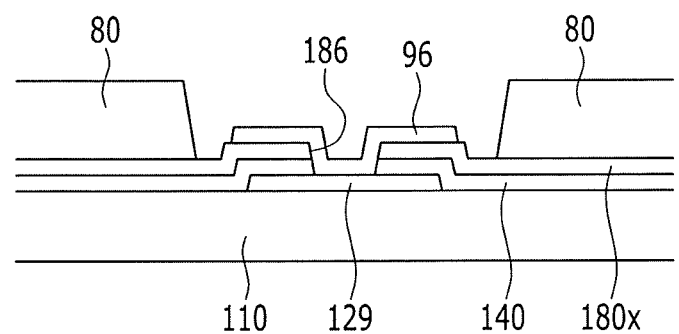
Figure 53:
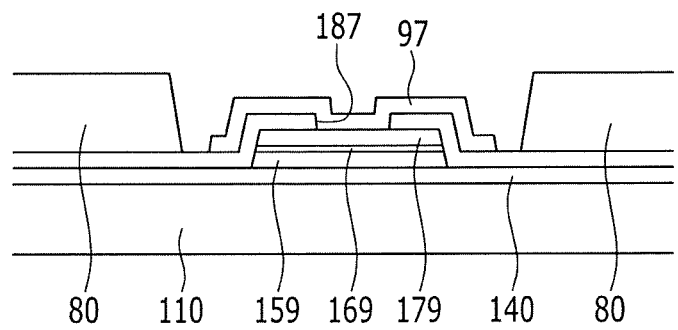
Figure 54:
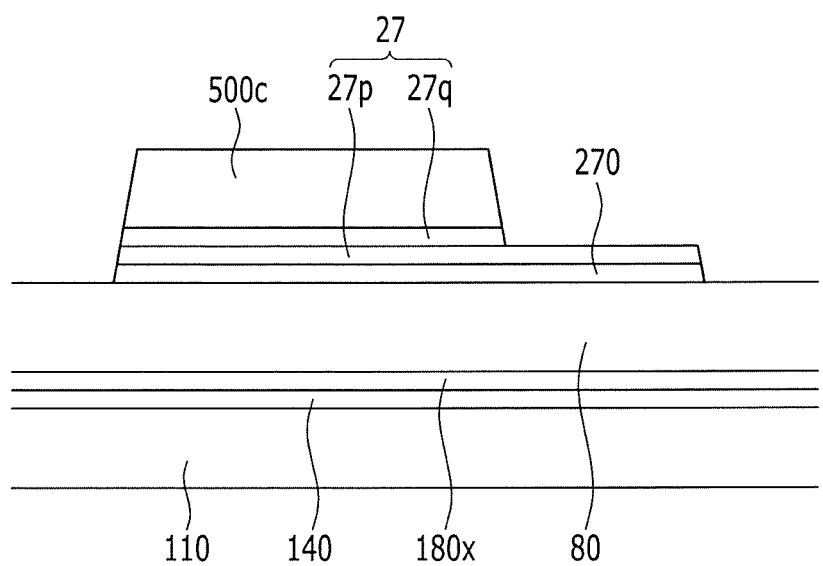
Figure 55:
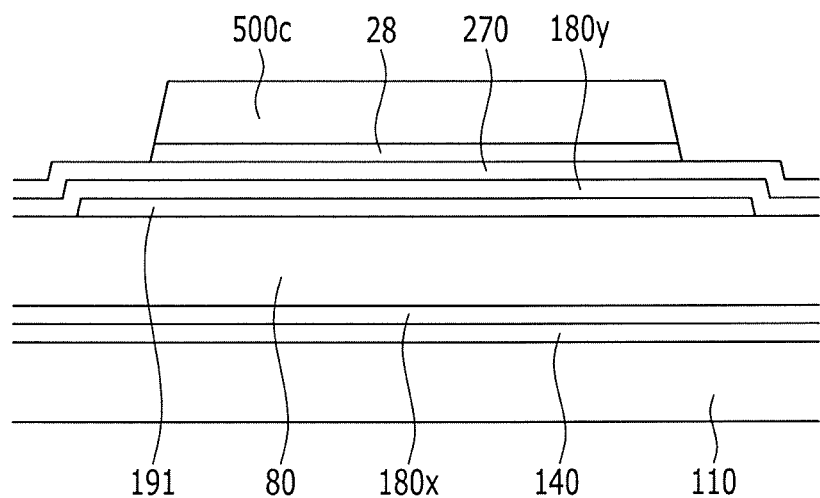

A manufacturing method of a liquid crystal display according to an exemplary embodiment of the present disclosure will be described with reference to FIGS. 13 to 22 in addition to FIGS. 1 to 4. FIG. 13 is a layout view illustrating a part of a manufacturing method of a liquid crystal display according to an exemplary embodiment of the present disclosure, FIG. 14 is a cross-sectional view of the liquid crystal display of FIG. 13 taken along line XIV-XIV, FIG. 15 is a cross-sectional view of the liquid crystal display of FIG. 13 taken along line XV-XV, and FIG. 16 is a cross-sectional view of the liquid crystal display of FIG. 13 taken along line XVI-XVI. FIGS. 17, 20, and 23 are cross-sectional views sequentially illustrating a manufacturing method of a liquid crystal display according to an exemplary embodiment of the present disclosure, which are cross-sectional views of the liquid crystal display of FIG. 1 taken along line II-II. FIGS. 18, 21, and 24 are cross-sectional views sequentially illustrating a manufacturing method of a liquid crystal display according to an exemplary embodiment of the present disclosure, which are cross-sectional views of the liquid crystal display of FIG. 1 taken along line III-III. FIGS. 19, 22, and 25 are cross-sectional views sequentially illustrating a manufacturing method of a liquid crystal display according to an exemplary embodiment of the present disclosure, which are cross-sectional views of the liquid crystal display of FIG. 1 taken along line IV-IV.

First, referring to FIGS. 13 to 16, a gate line 121 that includes a gate electrode 124 and a gate pad portion 129 is formed on a first insulation substrate 110, and a gate insulating layer 140 is formed on the gate line 121. The semiconductor 154, the ohmic contacts 163 and 165, and the data conductors, including the data line 171, the source electrode 173, the data pad portion 179, and the drain electrode 175 are formed on the gate insulating layer 140. The first passivation layer 180x and the organic layer 80 are formed on the data line 171 and the drain electrode 175. The first contact hole 186, the second contact hole 187, and the third contact hole 185 are formed through the first passivation layer 180x and the organic layer 80 to respectively expose a the gate pad portion 129, the data pad portion 179, and the drain electrode. Further, a first contact assistant 96 is formed on the gate pad portion 129 exposed through the first contact hole 186, a second contact assistant 97 is formed on the data pad portion 179 exposed through the second contact hole 187, and the pixel electrode 191 is formed that is connected with the drain electrode 175 through the first contact hole 185. In this case, the organic layer 80 may be a color filter and may be formed together with a light blocking member. A first thickness H1 of the organic layer 80 disposed in a display area that includes a plurality of pixels may be greater than a second thickness H2 of the organic layer 80 disposed in a peripheral area that includes the gate pad portion 129 and the data pad portion 179.

Thereafter, as illustrated in FIGS. 1 to 4, the second passivation layer 180y and the common electrode 270 are formed on the pixel electrode 191. This will be described with reference to FIGS. 17 to 25.

First, as illustrated in FIGS. 17 to 19, a first layer 10 including silicon nitride (SiNx) or silicon oxide (SiOx) is deposited on the pixel electrode 191, the first contact assistant 96, and the second contact assistant 97, and a second layer 20 including a transparent conductor is deposited on the first layer 10. A first photosensitive film 400 is deposited on the second layer 20.

Next, as illustrated in FIGS. 20 to 22, the first photosensitive film 400 is exposed and developed using a photomask to form a first photosensitive film pattern 400a. In this case, no first photosensitive film pattern 400a is formed around the gate pad portion 129 and the data pad portion 179.

Thereafter, referring to FIGS. 23 to 25, the second layer 20 and the first layer 10 are sequentially etched by using the first photosensitive film pattern 400a to form the common electrode 270 and the second passivation layer 180y, including the plurality of first cutouts 271 and the plurality of second cutouts 181. In this case, since there is no first photosensitive film pattern 400a formed around the gate pad portion 129 and the data pad portion 179, the common electrode 270 and the second passivation layer 180y are not formed around the gate pad portion 129 and the data pad portion 179.

As such, after forming the lower panel 100, a liquid crystal display is completed by forming the upper panel 200 and injecting the liquid crystal layer 3 between the two panels 100 and 200, as illustrated in FIGS. 1 to 4.

A manufacturing method of a liquid crystal display according to another exemplary embodiment of the present disclosure will now be described with reference to FIGS. 26 to 55. FIGS. 26, 31, 36, 41, 46, and 51 are cross-sectional views sequentially illustrating a manufacturing method of a liquid crystal display according to another exemplary embodiment of the present disclosure, which are cross-sectional views of the liquid crystal display of FIG. 13 taken along line XIV-XIV. FIGS. 27, 32, 37, 42, 47, and 52 are cross-sectional views sequentially illustrating a manufacturing method of a liquid crystal display according to another exemplary embodiment of the present disclosure, which are cross-sectional views of the liquid crystal display of FIG. 13 taken along line XV-XV. FIGS. 28, 33, 38, 43, 48, and 53 are cross-sectional views sequentially illustrating a manufacturing method of a liquid crystal display according to another exemplary embodiment of the present disclosure, which are cross-sectional views of the liquid crystal display of FIG. 13 taken along line XVI-XVI. FIGS. 29, 34, 39, 44, 49, and 54 are cross-sectional views sequentially illustrating a manufacturing method of a liquid crystal display according to another exemplary embodiment of the present disclosure, which are cross-sectional views of the liquid crystal display of FIG. 9 taken along line X-X. FIGS. 30, 35, 40, 45, 50, and 55 are cross-sectional views sequentially illustrating a manufacturing method of a liquid crystal display according to another exemplary embodiment of the present disclosure, which are cross-sectional views of the liquid crystal display of FIG. 7 taken along line VIII-VIII.

First, referring to FIGS. 26 to 30, a gate line 121 that includes a gate electrode 124 and a gate pad portion 129 is formed on a first insulation substrate 110, and a gate insulating layer 140 is formed on the gate line 121. A semiconductor 154, ohmic contacts 163 and 165, and data conductors that include a data line 171, a source electrode 173, a data pad portion 179, and a drain electrode 175 are formed on the gate insulating layer 140. The first passivation layer 180x and the organic layer 80 are formed on the data line 171 and the drain electrode 175. The first contact hole 186, the second contact hole 187, and the third contact hole 185 are formed through the first passivation layer 180x and the organic layer 80 to respectively expose a gate pad portion 129, the data pad portion 179, and the drain electrode. Further, a first contact assistant 96 is formed on the gate pad portion 129 exposed through the first contact hole 186, a second contact assistant 97 is formed on the data pad portion 179 exposed through the second contact hole 187, and the pixel electrode 191 is formed that is connected with the drain electrode 175 through the third contact hole 185. In this case, the organic layer 80 may be a color filter and may be formed together with a light blocking member. A first thickness H1 of the organic layer 80 disposed in a display area that includes a plurality of pixels may be greater than a second thickness H2 of the organic layer 80 disposed in a peripheral area that includes the gate pad portion 129 or the data pad portion 179.

Next, a first layer 10 that includes silicon nitride (SiNx) or silicon oxide (SiOx) is deposited on the pixel electrode 191, the first contact assistants 96, and the second contact assistants 97, a second layer 20 that includes a transparent conductor is deposited on the first layer 10, and a third layer 30 that includes a low resistance metal is deposited on the second layer 20. A second photosensitive film 500 is deposited on the third layer 30.

As illustrated in FIGS. 31 to 35, the second photosensitive film 500 is exposed and developed by using a photomask that includes a translucent area, a light transmitting area and a light blocking area to form second photosensitive film patterns 500a and 500b having thicknesses that vary by position. In this case, no second photosensitive film patterns 500a and 500b are formed around the gate pad portion 129 and the data pad portion 179.

Various methods may be used to vary the thickness of the photosensitive film by position. For example, a method of positioning the translucent area, the light transmitting area and the light blocking area in the photomask includes providing a slit pattern, a lattice pattern, or a thin film having medium transmittance and a medium thickness in the translucent area. For a slit pattern, a slit width or a distance between the slits may be less than a resolution of an exposer used in a photolithography process. Another example includes a method of using a photosensitive film capable of reflowing. That is, a reflowable photosensitive film is formed by an exposure mask having only a light transmitting area and a light blocking area, and the photosensitive film reflows into a region from which the photosensitive film was removed to form a thin portion. As such, a manufacturing method is simplified by reducing one photolithography process.

Next, as illustrated in FIGS. 36 to 40, the third layer 30, the second layer 20, and the first layer 10 are simultaneously or sequentially etched using the second photosensitive film patterns 500a and 500b as an etching mask to form a first insulating layer pattern 11, a second conductive layer pattern 21, and a third conductive layer pattern 31. In this case, since no second photosensitive film patterns 500a and 500b are formed around the gate pad portion 129 and the data pad portion 179, all of the first layer 10 to the third layer 30 are removed around the gate pad portion 129 and the data pad portion 179.

As illustrated in FIGS. 41 to 45, a height and thickness of the second photosensitive film patterns 500a and 500b is reduced by a method such as ashing, and simultaneously, the thin photosensitive film pattern 500a is removed to form a third photosensitive film pattern 500c.

Referring to FIGS. 46 to 50, after forming the third photosensitive film pattern 500c, the first insulation substrate 110 is annealed. The ITO or IZO that forms the second conductive layer pattern 21 is crystallized through annealing. In a manufacturing method of a liquid crystal display according to an illustrated exemplary embodiment, the first insulation substrate 110 may be annealed after forming the third photosensitive film pattern 500c. However, according to a manufacturing method of a liquid crystal display according to another exemplary embodiment of the present disclosure, after forming the first insulating layer pattern 11, the second conductive layer pattern 21, and the third conductive layer pattern 31 and before forming the third photosensitive film pattern 500c, the first insulation substrate 110 may be annealed to crystallize the ITO or IZO that forms the second conductive layer pattern 21.

Next, as illustrated in FIGS. 51 to 55, the third conductive layer pattern 31 is etched using the third photosensitive film pattern 500c as an etching mask to complete the second passivation layer 180y, the common electrode 270, the lower connection portion 27p of the connection portion 27, and the upper connection portion 27q of the connection portion 27 and the common electrode line 28.

Thereafter, the third photosensitive film pattern 500c is removed to form the lower panel 100.

As such, after forming the lower panel 100, a liquid crystal display is completed by forming the upper panel 200 and injecting the liquid crystal layer 3 between the two panels 100 and 200, as illustrated in FIGS. 7, 8, 9, and 10.

As described above, according to a manufacturing method of a liquid crystal display according to an exemplary embodiment of the present disclosure, the common electrode 270 and the second passivation layer 180y are simultaneously formed, and the common voltage line 28 and the connection portion 27, including the lower connection portion 27p and the upper connection portion 27q, are simultaneously formed. As a result, it is possible to reduce a manufacturing cost of the liquid crystal display and simultaneously, prevent a signal delay of the common voltage applied to the common electrode.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A liquid crystal display, comprising:
a plurality of pixel electrodes and a common electrode disposed on a first substrate that overlap each other with a passivation layer interposed therebetween;
a common voltage applying unit disposed in a peripheral area around a display area that includes the plurality of pixel electrodes, and
a connection portion disposed between the common voltage applying unit and the common electrode,
wherein the common electrode has a plurality of first cutouts,
the passivation layer has a plurality of second cutouts,
the first cutout and the second cutout have substantially the same planar shape, and
the connection portion is formed with the same layer as the common electrode.

2. The liquid crystal display of claim 1, wherein:
the connection portion includes a lower connection portion formed with the same layer as the common electrode, and
an upper connection portion disposed on the lower connection portion and including low resistance metal.

3. The liquid crystal display of claim 2, further comprising:
a common voltage line disposed on a portion of the common electrode,
wherein the common voltage line is formed from the same layer as the upper connection portion.

4. The liquid crystal display of claim 3, further comprising:
a plurality of gate lines and a plurality of data lines disposed on the first substrate, wherein:
the common voltage line extends parallel to the gate line.

5. The liquid crystal display of claim 3, wherein:
the common voltage line is disposed between two adjacent data lines and extends parallel to the data lines.

6. The liquid crystal display of claim 1, further comprising:
a plurality of gate lines and a plurality of data lines disposed on the first substrate;
a plurality of thin film transistors connected to the plurality of gate lines and the plurality of data lines, respectively; and
an organic layer disposed on the plurality of thin film transistors and wherein the plurality of pixel electrodes and the common electrode are disposed on the organic layer.

7. The liquid crystal display of claim 6, wherein:
the organic layer comprises a color filter.

8. The liquid crystal display of claim 7, further comprising:
a light blocking member disposed on the first substrate.

9. The liquid crystal display of claim 6, further comprising:
a second substrate facing the first substrate; and
a compensation electrode disposed on an outer surface of the second substrate.

10. The liquid crystal display of claim 9, wherein the common electrode on the first substrate overlaps the data line to form a first capacitor, and the compensation electrode on the second substrate forms a second capacitor with the common electrode.

11. The liquid crystal display of claim 10, wherein the compensation electrode is configured to receive a voltage having a polarity opposite to that of a data voltage applied to the data line to compensate for a coupling between the data line and the common electrode.

* * * * *